(12) United States Patent
Brown

(10) Patent No.: US 7,137,107 B1
(45) Date of Patent: Nov. 14, 2006

(54) MOTION CONTROL SYSTEMS AND METHODS

(75) Inventor: David W. Brown, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 0 days.

(21) Appl. No.: 10/836,031

(22) Filed: Apr. 29, 2004

Related U.S. Application Data

(60) Provisional application No. 60/467,667, filed on May 2, 2003, provisional application No. 60/466,588, filed on Apr. 29, 2003.

(51) Int. Cl.
| | |
|---|---|
| *G06F 9/45* | (2006.01) |
| *G06F 9/44* | (2006.01) |
| *G06F 19/00* | (2006.01) |
| *G05B 19/18* | (2006.01) |
| *G05B 19/42* | (2006.01) |
| *G05B 19/02* | (2006.01) |
| *B25J 9/16* | (2006.01) |

(52) U.S. Cl. .................. 717/137; 717/107; 700/56; 700/86; 700/186; 700/245; 318/568.1; 340/825.23

(58) Field of Classification Search ........... 717/106, 717/107, 104, 137, 143, 162; 700/19, 56, 700/86, 87, 174, 186, 245; 709/230, 231, 709/203, 219, 201; 318/568.1, 57; 340/825.22, 340/825.23
See application file for complete search history.

(56) References Cited

U.S. PATENT DOCUMENTS

| | | | |
|---|---|---|---|
| 4,159,417 A | 6/1979 | Rubincam | |
| 4,199,814 A | 4/1980 | Rapp et al. | |
| 4,418,381 A | 11/1983 | Molusis et al. | |
| 4,531,182 A | 7/1985 | Hyatt | |
| 4,688,195 A | 8/1987 | Thompson et al. | |
| 4,713,808 A | 12/1987 | Gaskill et al. | |
| 4,767,334 A | 8/1988 | Thorne et al. | |
| 4,769,771 A | 9/1988 | Lippmann et al. | |
| 4,782,444 A | 11/1988 | Munshi et al. | |
| 4,800,521 A | 1/1989 | Carter et al. | |
| 4,809,335 A | 2/1989 | Rumsey | |
| 4,815,011 A | 3/1989 | Mizuno et al. | |
| 4,829,419 A | 5/1989 | Hyatt | |
| 4,840,602 A | 6/1989 | Rose | |
| 4,846,693 A | 7/1989 | Baer | |
| 4,855,725 A | 8/1989 | Fernandez | |

(Continued)

FOREIGN PATENT DOCUMENTS

EP 0442676 A2 8/1991

(Continued)

OTHER PUBLICATIONS

Microsoft Corporation; "Dynamic Data Exchange"; *Windows 3.1 SDK Guide to Programming*; 1992, 1993; Chapter 22; 21 pages.

(Continued)

*Primary Examiner*—Crystal J. Barnes
(74) *Attorney, Agent, or Firm*—Michael R. Schacht; Schacht Law Office, Inc.

(57) ABSTRACT

A motion event system for transmitting events between a motion program and a motion device. The motion event system comprises a driver component, a motion component, and a motion event component. The driver component is associated with the motion device. The motion component allows communication between the motion program and the at least one driver component. The motion event component configures at least one of the driver component and the motion component to recognize events to be transmitted between the motion program and the motion device.

15 Claims, 14 Drawing Sheets

U.S. PATENT DOCUMENTS

| | | | |
|---|---|---|---|
| 4,857,030 A | 8/1989 | Rose |
| 4,887,966 A | 12/1989 | Gellerman |
| 4,897,835 A | 1/1990 | Gaskill et al. |
| 4,912,650 A | 3/1990 | Tanaka et al. |
| 4,923,428 A | 5/1990 | Curran |
| 4,937,737 A | 6/1990 | Schwane et al. |
| 4,987,537 A | 1/1991 | Kawata |
| 5,005,134 A | 4/1991 | Nakashima et al. |
| 5,005,135 A | 4/1991 | Morser et al. |
| 5,020,021 A | 5/1991 | Kaji et al. |
| 5,095,445 A | 3/1992 | Sekiguchi |
| 5,120,065 A | 6/1992 | Driscoll et al. |
| 5,126,932 A | 6/1992 | Wolfson et al. |
| 5,168,441 A | 12/1992 | Onarheim et al. |
| 5,175,684 A | 12/1992 | Chong |
| 5,175,817 A | 12/1992 | Adams et al. |
| 5,175,856 A | 12/1992 | Van Dyke et al. |
| 5,230,049 A | 7/1993 | Chang et al. |
| 5,245,703 A | 9/1993 | Hubert |
| 5,247,650 A | 9/1993 | Judd et al. |
| 5,291,416 A | 3/1994 | Hutchins |
| 5,368,484 A | 11/1994 | Copperman |
| 5,377,258 A | 12/1994 | Bro |
| 5,382,026 A | 1/1995 | Harvard et al. |
| 5,390,304 A | 2/1995 | Leach et al. |
| 5,390,330 A | 2/1995 | Talati |
| 5,392,207 A | 2/1995 | Wilson et al. |
| 5,400,345 A | 3/1995 | Ryan, Jr. |
| 5,402,518 A | 3/1995 | Lowery |
| 5,405,152 A | 4/1995 | Katanics et al. |
| 5,412,757 A | 5/1995 | Endo |
| 5,413,355 A | 5/1995 | Gonzalez |
| 5,438,529 A | 8/1995 | Rosenberg et al. |
| 5,450,079 A | 9/1995 | Dunaway |
| 5,453,933 A | 9/1995 | Wright et al. |
| 5,465,215 A | 11/1995 | Strickland et al. |
| 5,491,813 A | 2/1996 | Bondy et al. |
| 5,493,281 A | 2/1996 | Owens |
| 5,511,147 A | 4/1996 | Abdel-Malek |
| 5,541,838 A | 7/1996 | Koyama et al. |
| 5,576,727 A | 11/1996 | Rosenberg et al. |
| 5,577,253 A | 11/1996 | Blickstein |
| 5,596,994 A | 1/1997 | Bro |
| 5,600,373 A | 2/1997 | Chui et al. |
| 5,604,843 A | 2/1997 | Shaw et al. |
| 5,607,336 A | 3/1997 | Lebensfeld et al. |
| 5,608,894 A | 3/1997 | Kawakami et al. |
| 5,613,117 A | 3/1997 | Davidson et al. |
| 5,617,528 A | 4/1997 | Stechmann et al. |
| 5,618,179 A | 4/1997 | Copperman et al. |
| 5,623,582 A | 4/1997 | Rosenberg |
| 5,625,820 A | 4/1997 | Hermsmeier et al. |
| 5,625,821 A | 4/1997 | Record et al. |
| 5,636,994 A | 6/1997 | Tong |
| 5,652,866 A | 7/1997 | Aldred et al. |
| 5,655,945 A | 8/1997 | Jani |
| 5,659,753 A | 8/1997 | Murphy et al. |
| 5,666,161 A | 9/1997 | Kohiyama et al. |
| 5,670,992 A | 9/1997 | Yasuhara et al. |
| 5,691,897 A * | 11/1997 | Brown et al. ................. 700/56 |
| 5,691,898 A | 11/1997 | Rosenberg et al. |
| 5,701,140 A | 12/1997 | Rosenberg et al. |
| 5,704,837 A | 1/1998 | Iwasaki et al. |
| 5,707,289 A | 1/1998 | Watanabe et al. |
| 5,724,074 A | 3/1998 | Chainani et al. |
| 5,733,131 A | 3/1998 | Park |
| 5,734,373 A | 3/1998 | Rosenberg et al. |
| 5,737,523 A | 4/1998 | Callaghan et al. |
| 5,739,811 A | 4/1998 | Rosenberg et al. |
| 5,746,602 A | 5/1998 | Kikinis |
| 5,752,880 A | 5/1998 | Gabai et al. |
| 5,754,855 A | 5/1998 | Miller et al. |
| 5,764,155 A | 6/1998 | Kertesz et al. |
| 5,766,077 A | 6/1998 | Hongo |
| 5,772,504 A | 6/1998 | Machiguchi |
| 5,790,178 A | 8/1998 | Shibata et al. |
| 5,800,268 A | 9/1998 | Molnick |
| 5,801,946 A | 9/1998 | Nissen et al. |
| 5,802,365 A | 9/1998 | Kathail et al. |
| 5,805,785 A | 9/1998 | Dias et al. |
| 5,818,537 A | 10/1998 | Enokida et al. |
| 5,821,920 A | 10/1998 | Rosenberg et al. |
| 5,821,987 A | 10/1998 | Larson |
| 5,822,207 A | 10/1998 | Hazama et al. |
| 5,825,308 A | 10/1998 | Rosenberg |
| 5,828,575 A | 10/1998 | Sakai |
| 5,836,014 A | 11/1998 | Faiman, Jr. |
| 5,846,132 A | 12/1998 | Junkin |
| 5,848,415 A | 12/1998 | Guck |
| 5,852,441 A | 12/1998 | Nakajima et al. |
| 5,855,483 A | 1/1999 | Collins et al. |
| 5,867,385 A * | 2/1999 | Brown et al. ................. 700/56 |
| 5,873,765 A | 2/1999 | Rifkin et al. |
| 5,889,670 A | 3/1999 | Schuler et al. |
| 5,889,672 A | 3/1999 | Schuler et al. |
| 5,890,963 A | 4/1999 | Yen |
| 5,907,704 A | 5/1999 | Gudmundson et al. |
| 5,907,831 A | 5/1999 | Lotvin et al. |
| 5,914,876 A | 6/1999 | Hirai |
| 5,920,476 A | 7/1999 | Hennessey et al. |
| 5,921,780 A | 7/1999 | Myers |
| 5,924,013 A | 7/1999 | Guido et al. |
| 5,956,484 A | 9/1999 | Rosenberg et al. |
| 5,959,613 A | 9/1999 | Rosenberg et al. |
| 5,960,085 A | 9/1999 | De La Huerga |
| 5,977,951 A | 11/1999 | Danieli et al. |
| 5,984,499 A | 11/1999 | Nourse et al. |
| 6,012,961 A | 1/2000 | Sharpe et al. |
| 6,020,876 A | 2/2000 | Rosenberg et al. |
| 6,028,593 A | 2/2000 | Rosenberg et al. |
| 6,031,973 A | 2/2000 | Gomi et al. |
| 6,038,603 A | 3/2000 | Joseph |
| 6,046,727 A | 4/2000 | Rosenberg et al. |
| 6,057,828 A | 5/2000 | Rosenberg et al. |
| 6,061,004 A | 5/2000 | Rosenberg |
| 6,065,365 A | 5/2000 | Ostler et al. |
| 6,070,010 A | 5/2000 | Keenleyside et al. |
| 6,078,308 A | 6/2000 | Rosenberg et al. |
| 6,078,968 A | 6/2000 | Lo et al. |
| 6,080,063 A | 6/2000 | Khosla |
| 6,083,104 A | 7/2000 | Choi |
| 6,090,156 A | 7/2000 | MacLeod |
| 6,100,874 A | 8/2000 | Schena et al. |
| 6,101,425 A | 8/2000 | Govindaraj et al. |
| 6,101,530 A | 8/2000 | Rosenberg et al. |
| 6,104,158 A | 8/2000 | Jacobus et al. |
| 6,125,385 A | 9/2000 | Wies et al. |
| 6,128,006 A | 10/2000 | Rosenberg et al. |
| 6,131,097 A | 10/2000 | Peurach et al. |
| 6,133,867 A | 10/2000 | Eberwine et al. |
| 6,139,177 A | 10/2000 | Venkatraman et al. |
| 6,144,895 A | 11/2000 | Govindaraj et al. |
| 6,147,647 A | 11/2000 | Tassoudji et al. |
| 6,161,126 A | 12/2000 | Wies et al. |
| 6,166,723 A | 12/2000 | Schena et al. |
| 6,169,540 B1 | 1/2001 | Rosenberg et al. |
| 6,173,316 B1 | 1/2001 | De Boor et al. |
| 6,191,774 B1 | 2/2001 | Schena et al. |
| 6,195,592 B1 | 2/2001 | Schuler et al. |
| 6,201,996 B1 | 3/2001 | Crater et al. |
| 6,209,037 B1 | 3/2001 | Brown et al. |
| 6,216,173 B1 | 4/2001 | Jones et al. |
| 6,219,032 B1 | 4/2001 | Rosenberg et al. |
| 6,219,033 B1 | 4/2001 | Rosenberg et al. |

| | | |
|---|---|---|
| 6,232,891 B1 | 5/2001 | Rosenberg |
| 6,233,545 B1 | 5/2001 | Datig |
| 6,243,078 B1 | 6/2001 | Rosenberg |
| 6,246,390 B1 | 6/2001 | Rosenberg |
| 6,247,994 B1 | 6/2001 | DeAngelis et al. |
| 6,252,579 B1 | 6/2001 | Rosenberg et al. |
| 6,252,853 B1 | 6/2001 | Ohno |
| 6,259,382 B1 | 7/2001 | Rosenberg |
| 6,271,833 B1 | 8/2001 | Rosenberg et al. |
| 6,278,439 B1 | 8/2001 | Rosenberg et al. |
| 6,285,351 B1 | 9/2001 | Chang et al. |
| 6,286,133 B1 | 9/2001 | Hopkins |
| 6,288,705 B1 | 9/2001 | Rosenberg et al. |
| 6,288,716 B1 | 9/2001 | Humpleman |
| 6,290,565 B1 | 9/2001 | Galyean, III et al. |
| 6,292,170 B1 | 9/2001 | Chang et al. |
| 6,292,174 B1 | 9/2001 | Mallett et al. |
| 6,292,712 B1 | 9/2001 | Bullen |
| 6,292,714 B1 | 9/2001 | Okabayashi |
| 6,295,530 B1 | 9/2001 | Ritchie et al. |
| 6,300,936 B1 | 10/2001 | Braun et al. |
| 6,300,937 B1 | 10/2001 | Rosenberg |
| 6,301,634 B1 | 10/2001 | Gomi et al. |
| 6,304,091 B1 | 10/2001 | Shahoian et al. |
| 6,305,011 B1 | 10/2001 | Safonov |
| 6,309,275 B1 | 10/2001 | Fong et al. |
| 6,310,605 B1 | 10/2001 | Rosenberg |
| 6,317,116 B1 | 11/2001 | Rosenberg et al. |
| 6,317,871 B1 | 11/2001 | Andrews et al. |
| 6,343,349 B1 | 1/2002 | Braun et al. |
| 6,345,212 B1 | 2/2002 | Nourse |
| 6,353,850 B1 | 3/2002 | Wies et al. |
| 6,366,272 B1 | 4/2002 | Rosenberg et al. |
| 6,366,273 B1 | 4/2002 | Rosenberg et al. |
| 6,366,293 B1 | 4/2002 | Hamilton et al. |
| 6,374,195 B1 | 4/2002 | Li et al. |
| 6,374,255 B1 | 4/2002 | Peurach et al. |
| 6,400,996 B1 | 6/2002 | Hoffberg et al. |
| 6,401,005 B1 | 6/2002 | Schwarz et al. |
| 6,425,118 B1 | 7/2002 | Molloy et al. |
| 6,439,956 B1 | 8/2002 | Ho |
| 6,442,451 B1 | 8/2002 | Lapham |
| 6,463,404 B1 | 10/2002 | Appleby |
| 6,470,377 B1 | 10/2002 | Sevcik et al. |
| 6,473,824 B1 | 10/2002 | Kreissig et al. |
| 6,480,896 B1 | 11/2002 | Brown et al. |
| 6,497,606 B1 | 12/2002 | Fong et al. |
| 6,513,058 B1 * | 1/2003 | Brown et al. ............... 709/201 |
| 6,516,236 B1 * | 2/2003 | Brown et al. ............... 700/56 |
| 6,518,980 B1 | 2/2003 | DeMotte et al. |
| 6,519,594 B1 | 2/2003 | Li |
| 6,519,646 B1 | 2/2003 | Gupta et al. |
| 6,523,171 B1 | 2/2003 | Dupuy et al. |
| 6,528,963 B1 | 3/2003 | Hong |
| 6,542,925 B1 | 4/2003 | Brown et al. |
| 6,546,436 B1 | 4/2003 | Fainmesser et al. |
| 6,559,860 B1 | 5/2003 | Hamilton et al. |
| 6,571,141 B1 | 5/2003 | Brown |
| 6,606,665 B1 | 8/2003 | Govindaraj et al. |
| 6,615,091 B1 | 9/2003 | Birchenough et al. |
| 6,652,378 B1 | 11/2003 | Cannon et al. |
| 6,658,627 B1 | 12/2003 | Gallup et al. |
| 6,662,361 B1 | 12/2003 | Jackson |
| 6,665,688 B1 | 12/2003 | Callahan et al. |
| 6,678,713 B1 | 1/2004 | Mason et al. |
| 7,024,666 B1 * | 4/2006 | Brown ............... 717/137 |
| 7,031,798 B1 * | 4/2006 | Brown et al. ............... 700/174 |
| 2001/0020944 A1 | 9/2001 | Brown et al. |
| 2001/0029443 A1 | 10/2001 | Miyahira |
| 2001/0032268 A1 | 10/2001 | Brown et al. |
| 2001/0037492 A1 | 11/2001 | Holzmann |
| 2002/0044297 A1 | 4/2002 | Tanaka |
| 2002/0052939 A1 | 5/2002 | Lee et al. |
| 2002/0129333 A1 * | 9/2002 | Chandhoke et al. ............ 717/107 |
| 2002/0165627 A1 | 11/2002 | Brown et al. |
| 2002/0165708 A1 | 11/2002 | Kumhyr |
| 2002/0177453 A1 | 11/2002 | Chen et al. |
| 2003/0033150 A1 | 2/2003 | Balan et al. |
| 2003/0037117 A1 | 2/2003 | Tabuchi |
| 2003/0061023 A1 | 3/2003 | Menezes et al. |
| 2003/0069998 A1 | 4/2003 | Brown et al. |
| 2003/0230998 A1 * | 12/2003 | Miyaji et al. ............... 318/625 |
| 2004/0019683 A1 | 1/2004 | Lee et al. |
| 2004/0025150 A1 | 2/2004 | Heishi et al. |
| 2004/0044794 A1 | 3/2004 | Srinivasan |

FOREIGN PATENT DOCUMENTS

| | | |
|---|---|---|
| EP | 0 281 427 B1 | 8/1992 |
| EP | 0508912 A1 | 10/1992 |
| EP | 0 583 908 A2 | 2/1994 |
| EP | 821522 A2 | 1/1998 |
| EP | 0275826 A1 | 7/1998 |
| GB | 2 244 896 A | 12/1991 |
| JP | 59 228473 | 6/1983 |
| JP | 8161335 A | 6/1996 |
| JP | 2000020114 A | 1/2000 |
| WO | WO 92/11731 | 7/1992 |
| WO | WO 93/08654 | 4/1993 |
| WO | WO 95/07504 | 3/1995 |

OTHER PUBLICATIONS

Microsoft Corporation; "Dynamic Data Exchange Management Library"; *Win32 SDK: Prog. Ref.* vol. 2; 1992, 1993; Chapter 77; 26 pages.
Microsoft Corporation; "Network Dynamic Data Exchange"; *Windows for Workgroups 3.1 Resource Kit*; 1992, 1993; Chapter 11; 19 pages.
WOSA Backgrounder: Delivering Enterprise Services to the Windows-based Desktop, Jul. 1993, Microsoft Development Library; pp. 1-19.
WOSA Inside Windows 95; pp. 348-351.
Software Products for Industrial Automation, ICONICS, Inc.; 1993; 6 pages.
WEB 3.0 Product Brochure, Trihedral Engineering Ltd. (1994); 6 pages.
The Complete, Computer-Based Automation Tool (IGSS) Seven Technologies A/S; 6 pages.
Oregon Micro Systems, Inc.; Precision Motion Controls Product Guide: pp. 1-20.
AIMAX-WIN Product Brochure, TA Engineering Co., Inc.; 1993; 8 pages.
XANALOG Model NL-SIM Product Brochure, XANALOG, 1994; 4 pages.
ExperTune PID Tuning Software, Gerry Engineering Software; 1993; 6 pages.
PMAC Product Catalog, 1992; p. 43.
Paragon TNT Product Brochure, Intec Controls Corp.; 6 pages.
Aerotech Motion Control Product Guide; pp. 233-234.
OpenBatch Product Brief, PID, Inc.; 1994; 6 pages.
PC/DSP-Series Motion Controller C Programming Guide; 1992; pp. 1-54.
FIX Product Brochure, Intellution (1994); 6 pages.
Compumotor Digiplan (1993-1994) Catalog pp. 10-11.
Sue Chen Jonathon Lin: *Computer Numerical Control: Essentials in Programming and Networking*, Part V, Chapter 27; 1994; pp. 824-848; Delmar Publishers, Inc.; U.S.
Pritschow et al.; "Open System Controllers: Challenge for the Future of the Machine Tool Industry"; pub. Jan. 15, 1993; pp. 449-452.
William E. Ford; "What Is an Open Architecture Robot Controller" pub. Aug. 16, 1994; pp. 27-32.
Marcos et al.; "A New Solution for Integrating Control Devices Involved in Computer-Integrated Manufacturing"; pub Sep. 2, 1996; pp. 485-490.

Chu and Wang; "Development of a Practical SFC System for CNC Machine Shop"; pub. 1994; pp. 362-367.
MICROSOFT; "The Microsoft Object Technology Strategy"; pub. Mar. 1994; pp. 1-33.
MICROSOFT; "Open Systems: Technology, Leadership, and Collaboration"; pub. Mar. 1994; pp. 1-15.
MICROSOFT; Microsoft OLE Today and Tomorrow: Technology Overview; pub. Dec. 1993; pp. 1-9.
MICROSOFT; "Object Linking and Embedding 2.0 Backgrounder"; pub. Sep. 1993; pp. 1-15.
Robert Anderson; "SMART: A Modular Architecture for Robotics and Teleoperation"; pub. 1993; pp. 416-421.
Proctor et al.; "Validation of standard Interfaces for Machine Control"; pub. 1996; pp. 659-664.
Altintas et al.; "Design and Analysis of a Modular CNC System"; pub. Mar. 4, 1990; pp. 305-316.
Wright et al.; "Open Architecture Manufacturing: The Impact of Open-System Computers on Self-sustaining Machinery and the Machine Tool Industry"; pp. 41-47.
Protoctor et al.; "Open Architecture Controllers"; pub. Jun. 1997; pp. 60-64.
Lutz et al.; "OSACA-the Vendor-Neutral Control Architecture"; pub. Dec. 1997; pp. 247-256.
Morales et al.; "A Generalised Software Control System for Industrial Robots"; pub. 1998; pp. 411-416.
Feng et al.; "Distributed Control of a Multiple-Tethered Mobile Robot System for Highway Maintenance and Construction"; pub Nov. 1997; pp. 383-392.
Fedrowitz; IRL-Based Expansion of the Commonly Used High-Level Language C for Robot Programming: pub. Oct. 1995; 5 pages.
Szabo et al.; "Validation Results of Specifications for Motion Control Interoperability"; pub. Sep. 1997; pp. 166-176.
Chang et al.; "Development and Implementation of an Application Programming Interface for PC/DSP-based Motion Control System"; pub. 1998; pp. 94-105.
Erol et al.; "Open System Architecture Modular Tool Kit for Motion and Machine Control"; pub. Sep. 2000; pp. 281-291.
Mizukawa et al.; "OriN: Open Robot Interface for the Network: A Proposed Standard"; pub. May 2000; pp. 344-350.
Michaloski et al.; "A Framework for Component-based CNC Machines" pub. Nov. 1998; pp. 132-143.
Bouzouia et al.; "A Three-layer Workcell Control Architecture Design"; pub. May 1998; pp. 1185-1191.
Morales et al.; "GENERIS: The EC-JRC Generalized Software Control System for Industrial Robots"; pub. 1999; pp. 26-33.
Muir et al.; "Mechatronic Objects for Real-time Control Software Development"; pub. Nov. 1998; pp. 251-265.
Cho et al.; "A Comnpact/Open Network-based Controller Incorporating Modular Software Architecture for a Humanoid Robot"; pub. 1999; pp. 341-355.
Ge et al.; "A One-stop Solution in Robotic Control System Design"; pub. Sep. 2000; pp. 42-55.
McGraw et al.; "A Friendly Command, Control, and Information System for Astronomy"; pub. 1996; pp. 356-367.
Jackman; "Robotic Control Using Sequential Function Charts"; pub. 1996; pp. 120-128.
Mizukawa et al.; "De-facto Standard API for Open and Networked Industrial Robots"; pub. Oct. 1999; pp. 455-462.
Leu et al.; "A Telemanufacturing Workcell over the Internet"; pub. Nov. 1998; pp. 230-237.
Natale et al.; "Robust Hybrid Force/Position Control with Experiments on an Industrial Robot"; pub. Sep. 19, 1999; pp. 956-961.
Nilsson et al.; "Integrated Architecture for Industrial Robot Programming and Control"; pub. Dec. 31, 1999; pp. 205-226.
Valera et al.; "Interactive Online Evaluation of Robot Motion Control"; pub. Aug. 22, 1999; pp. 1039-1043.
"NEMI Low-cost Controller Project"; pub. Dec. 1996; total pages 392.
Sperling; "Designing Applications for an OSACA Control"; pub. Nov. 16, 1997; 5 pages.
Sperling et al.; "Enabling Open Control Systems: An Introduction to the OSACA System Platform"; pub. May 1996; pp. 1-8.

OMAC Requirements Document; "Requirements of Open Modular Architecture Controllers for Applications in the Automotive Industry"; pub. Dec. 13, 1994; pp. 1-13.
GM Powertrain Group Manufacturing Engineering Controls Council; "Open, Modular Architecture Controls at GM Powertrain"; pub. May 14, 1996; pp. 1-33.
Team ICLP API Working Group; "Technologies Enabling Agile Manufacturing (TEAM) Intelligent Closed Loop Processing"; pub. Jan. 11, 1996; 30 pages.
Bradley Bargen and Peter Donnely; *Inside Direct X—In Depth Techniques for Developing High-Performance Multimedia Applications*, 1988; Chps. 1, 18-20, 22-27; Microsoft Press; U.S.
Peter Kovach; *Inside Direct3D—The Definitive Guide for Real-Time 3D Power and Performance for Microsoft Windows*; 2000; Chps. 1, 7, 15; Microsoft Press; U.S.
M. Farsi and M. Barbosa; *CANopen Implementation—Applications to Industrial Networks*; 2000; Chps. 1, 2 and 3; Research Studies Press Ltd.; England and U.S.
Wolfhard Lawrenz; *CAN System Engineering—From Theory to Practical Applications*; 1997; Chps. 1, 2.1, 2.2, 3.2 and 4.1; Springer-Verlag New York, Inc.; U.S.
Allen-Bradley; "CNCnet Software Library"; Oct. 1992; Publication 8000-6.1.1; U.S.
Robert Bosch GmbH; "CAN Specification"; Sep. 1991; Version 2.0.
SISCO, Inc.; "Overview and Introduction to the Manufacturing Message Specification (MMS)"; 1994-1995; Revision 2; Systems Integration Specialists Company, Inc.; Sterling Heights, Michigan, U.S.
ISO-9506-1 "Industrial Automation Systems—Manufacturing Message Specification—Part 1: Service definition"; Aug. 2000; pp. i-22; ISO/IEC; Switzerland.
ISO-9506-2 "Industrial Automation Systems—Manufacturing Message Specification—Part 2: Protocol specification"; Aug. 2000; pp. i-6; ISO/IEC; Switzerland.
SISCO, Inc.; "MMS-EASE"; Jan. 1996; Systems Integration Specialists Company, Inc.; Sterling Heights, Michigan, U.S.
ANSI/EIA-484-A "Electrical and Mechanical Interface Characteristics and Line Control Protocol Using Communication Control Characters for Serial Data Link Between a Direct Numerical Control System and Numerical Control Equipment Employing Asynchronous Full Duplex Transmission"; Jun. 1995; Electronic Industries Association; U.S.
ISO/IEC 7498-1 "Information Technology—Open Systems Interconnection-Basic Reference Model: The Basic Model"; Nov. 1994; U.S.
ISO/IEC 7498-3 "Information Technology—Open Systems Interconnection-Basic Reference Model: Naming and Addressing"; Apr. 1997; U.S.
Todd J. Schuett; "The Benefits and Data Bottlenecks of High Speed Milling"; Aug. 1995; conference paper presented at Southeastern Michigan Chapter American Mold Builders Association; Creative Technology Corporation; U.S.
Todd J. Schuett; "The Ultimate DNC; Direct CNC Networking (DCN)";*Modern Machine Shop*; Jan. 1996; Creative Technology Corporation; U.S.
Todd J. Schuett; "Advanced Controls for High Speed Milling"; conference paper presented at the SME "High Speed Machining" conference; May 7-8, 1996; Creative Technology Corporation; U.S.
Leitao, Machado & Lopes; "A Manufacturing Cell Integration Solution"; paper developed at CCP as a part of the ESPRIT 5629 Project; Oct. 1995.
Mitsubishi Electric; *Mitsubishi Electric Advance: Programmable Logic Controllers Edition*; Sep. 1996; vol. 76; Mitsubishi Electric Corporation; Tokyo.
Farsi, M.; "Flexible and Reliable Robotics Cells in Factory Automation"; 1993; pp. 520-525.
Chu & Wang; "Development of a Practical SFC System for CNC Machine Shop"; *International Conference on Data and Knowledge Systems for Manufacturing and Engineering*; May 1994; pp. 362-367, vol. 1; pp. xx+745, vol. 2.; Chinese Univ.; Hong Kong.
Farsi, M.; "Device Communication for Flexible Manufacturing:-A New Concept"; 1994; pp. 328-334.

Farsi, M.; "A Production Cell Communication Model in Factory Automation Using the Controller Area Network"; 1995; pp. 90-95.

Farsi, M. "CANopen: The Open Communications Solution"; 1996; pp. 112-116.

Katayama et al.; "A Motion Control System with Event-driven Motion-module Switching Mechanism for Robotic Manipulators"; *IEEE International Workshop on Robot and Human Communication*; Jul. 1993; pp. 320-325; U.S.

Matsui et al.; "An Event-Driven Architecture for Controlling Behaviors of the Office Conversant Mobile Robot, *Jijo-2*"; *Proceedings of the 1997 IEEE International Conference on Robotics and Automation*; Apr. 1997; pp. 3367-3372; U.S.

Microsoft Corporation; "How to Write and Use ActiveX Controls for Microsoft Windows CE 3.0"; *Windows CE 3.0 Technical Articles*; Jun. 2000; pp. 1-5.

Microsoft Corporation; "Notes on Implementing an OLE Control Container"; *ActiveX Controls Technical Articles*; Sep. 21, 1994; pp. 1-47.

Microsoft Corporation; "What OLE Is Really About"; *OLE (General) Technical Articles*; Jul. 1996; pp. 1-33.

Microsoft Corporation; "Categorizing by Component Capabilities"; *Platform SDK: COM*; Nov. 2001; pp. 1-23.

Kent Brown, "SOAP for Platform-Neutral-Interoperbility", Sep. 1, 2000, 16 pages.

Pirjaniian et al., "Hierarchical Control for Navigation Using Heterogeneous Models", Nov. 1, 1995, 19 pages, Denmark.

Blasvaer et al., "An Autonomous Mobile Robot System", Jun. 8, 1994; Chapters 4 and 6.7, pp. Denmark.

Stewart et al., "Implementing Real-Time Robotic Systems Using CHIMERA II", IEEE, 1990, pp. 254-255, sections 3.1 and 3.2.

Paidy et al., "Software Architecture for a Cell Controller", IEEE, 1991, pp. 344-345.

Payton et al., "Intelligent Real-Time Control of Robotic Vehicles", ACM, Aug. 1, 1991, vol. 34, No. B, pp. 49-63.

Internet Location Website http://motion-controls.globalspec.com/LearnMore/Motion_Controls/Machine_Motion_Controllers/CNC_Controllers, "About CNC Controllers", 1999.

* cited by examiner

FIG. 9

```
Dim xmcSys As XMCaSystemObj
Dim xmcVar As XMCaVariableObj
Dim xmcVarMap As XMCaVariableMappingObj
Dim xmcVarMapList As XMCaVariableMappingListObj
Dim val As Variant
Dim rgData(1 to 4) As Variant Set xmcVar = xmcSys.GetVariableObj()

'--------------------------------
' Read/Write item
'--------------------------------
val = xmcVar.Read( "Foo" )
xmcvar.Write "Foo", 1.0

'--------------------------------
' Read/Write array
'--------------------------------
xmcVar.Read "Boo", rgData()
xmcvar.Write "Boo", rgData()

'--------------------------------
' Variable Support
'--------------------------------
xmcVar.GetNameList rgNames()
xmcVar.GetAttributes "Boo", strAttrib '--------------------------------
' Variable mapping Support
'--------------------------------
Set xmcVarMap = xmcSys.GetVariableMappingObj()

xmcVarMap.AddMapping "Boo", "APC1:MULTI_SETUP:(0):(1){I4}"
xmcVarMap.RemoveMapping "Boo"
xmcVarMap.RemoveAllMappings Set xmcVarMapList = xmcVarMap.GetMappingList()

For Each varMapItem In xmcVarMapList
    If (Not varMapItem.ReadOnly) then
       varMapItem.Name = "Foo"
       varMapItem.Map = _

":PI_FIXTURE_OFFSET_TABLE:(6)(7)(8..9).x_axis_value:(1)(1)(2)[{I4}]
"
     End If
Next
```

US 7,137,107 B1

MOTION CONTROL SYSTEMS AND METHODS

RELATED APPLICATIONS

This application claims priority of U.S. Provisional Patent Application Ser. Nos. 60/466,588 filed Apr. 29, 2003, and 60/467,667 filed May 2, 2003, the contents of which are incorporated herein by reference.

TECHNICAL FIELD

The present invention relates to motion control systems and, in particular, to systems that allow the automation of motion tasks associated with Industrial and Consumer Automation processes.

BACKGROUND OF THE INVENTION

A motion control application is software that defines a sequence of motion steps required to perform a motion task. A motion controller is hardware and software that, in combination with a motion control device, is capable of converting motion commands into physical movement of an object. The term motion controller will be used herein to include the motion control device.

Typically, the motion commands executed by a motion controller are proprietary. The combination of a motion control software application and one or more motion controllers will be referred to herein as a motion control system.

In many cases, motion control software applications are specifically written for one or more proprietary motion controller. Therefore, if one or more new motion controllers are to be used in place of one or more original motion controllers, a motion control software application written for the original motion controller(s) must be rewritten to accommodate the new motion controller(s). A motion control software application written for one or more proprietary controllers is referred to as hardware dependent.

In general, hardware dependence is undesirable because the owner of the motion control system must either commit to the vendors of the proprietary controllers or discard the motion control application when a new motion controller is used.

The need exists for systems and methods that may be used to facilitate the writing of motion control applications that are hardware independent.

SUMMARY OF THE INVENTION

The present invention may be embodied as a motion event system for transmitting events between a motion program and a motion device. The motion event system comprises a driver component, a motion component, and a motion event component. The driver component is associated with the motion device. The motion component allows communication between the motion program and the at least one driver component. The motion event component configures at least one of the driver component and the motion component to recognize events to be transmitted between the motion program and the motion device.

BRIEF DESCRIPTION OF THE DRAWINGS

FIG. 9 depicts code illustrating the use of the variable support objects in the context of Microsoft Visual Basic;

DETAILED DESCRIPTION OF THE INVENTION

The present invention relates to systems for handling events generated in the context of a motion system. Such events will be referred to as motion events. In addition, a common source of events in a motion system is a change in data associated with a variable. The present invention also relates to a variable support system for accessing and mapping proprietary variables associated with motion controllers.

The following discussion will thus describe both a motion event system for handling motion events and a variable support system for accessing data values associated with motion variables. While a significant benefit can be obtained by combining the motion event system and variable support system as described herein, each of these systems can operate independently, and the Applicant reserves the right to pursue separate claims directed towards each of the motion event system and the variable support system.

I. Motion Event Systems

Figure 1:
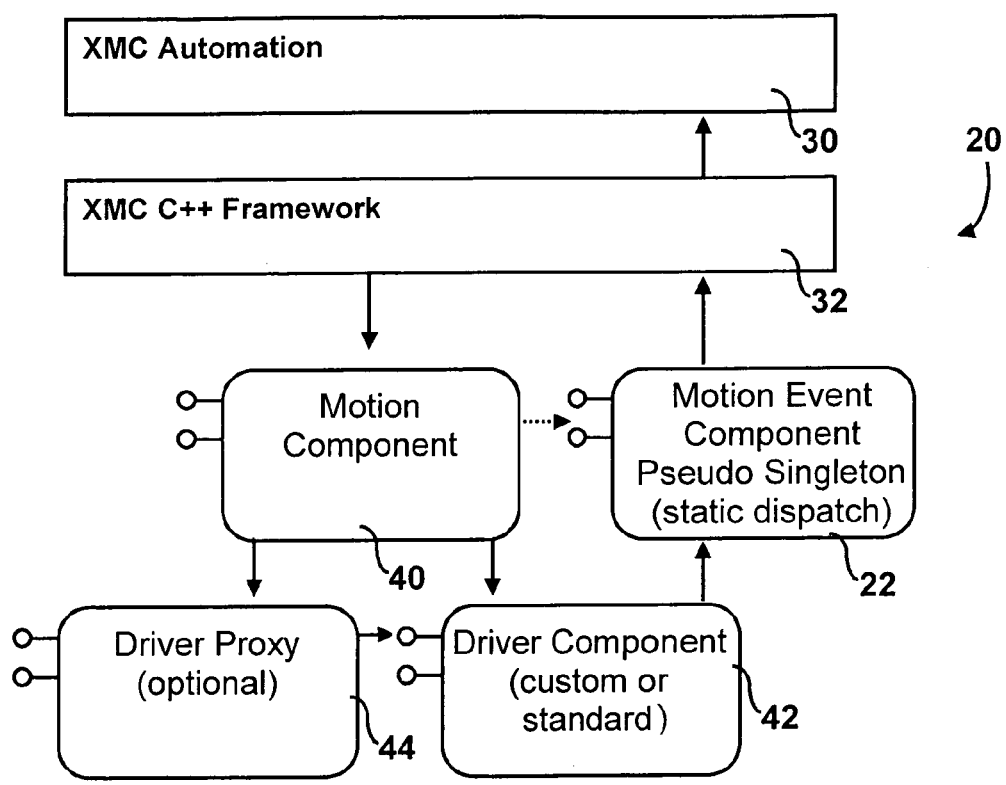
FIG. 1 is an object interaction map depicting an event monitoring system for use by a motion system.

Referring initially to FIG. 1 of the drawing, depicted at 20 therein is an example motion event system 20 comprising a motion event component 22. The example motion event component 22 routes events among the other components (custom driver, standard driver, or stream) of the system 20 as will be described in further detail below.

As shown in FIG. 1, the motion event system 20 further comprises an automation layer 30 and a C++ framework layer 32. The automation layer 30 allows access to the motion component 40 by a client (not shown) written in any automation aware language such as Visual Basic, VBA, VBScript, Java, and NET languages. The client may be a component, application, or other software using the motion services provided by the motion event system 20. The C++ framework layer 32 implements a very thin wrapper designed to facilitate access to COM interfaces.

The example motion event system 20 further comprises a motion component 40 and a driver component 42. The example motion component 40 implements a set of OLE interfaces designed for use in the context of motion control systems. The example driver component 42 implements the driver logic for a given motion platform and may be either custom or standard.

Optionally, the system 20 may further comprise a driver proxy component 44. The driver proxy component 44 acts as a proxy between a first set of driver original interface requirements and a second set of slim driver interfaces. When the driver component 42 is standard, the standard driver component 42 performs the functions both of the driver proxy component 44 and of a custom driver component 42.

Figure 2:
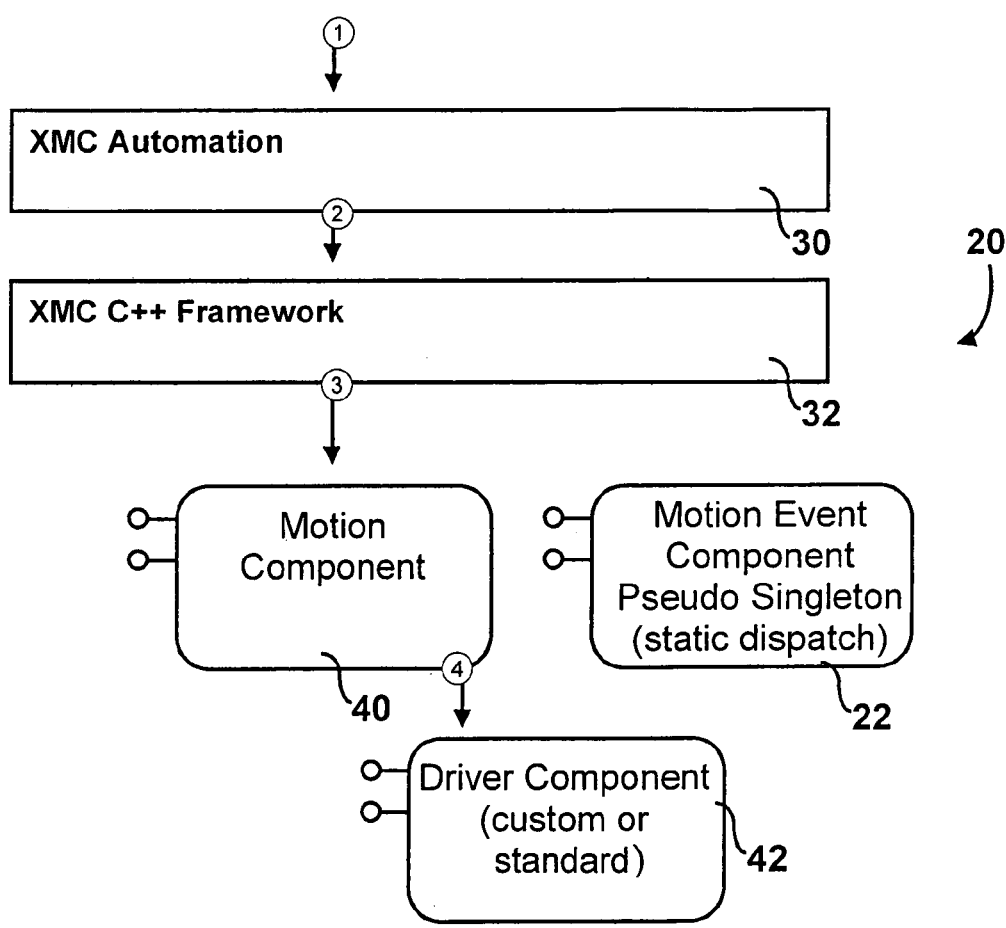
FIG. 2 is a scenario map depicting the making of a normal method call.

Referring now to FIG. 2 of the drawing, depicted therein is a scenario map depicting the operation of the system 20 when making a normal method call. When making a normal call to the motion component 40, the thread of control is routed from the caller to the custom driver component 42 implementing the service requested and the following steps are performed:

1. First the caller calls the function on the automation layer 30 (or C++ framework layer 32).
2. If the automation layer 30 is called, it in turn calls the C++ framework layer 32.
3. The C++ framework layer 32 calls the appropriate motion service provided by the motion component 40.
4. Internally the motion component 40 then routes the request to the target motion driver 42. At this point no events have been triggered.

Figure 3:
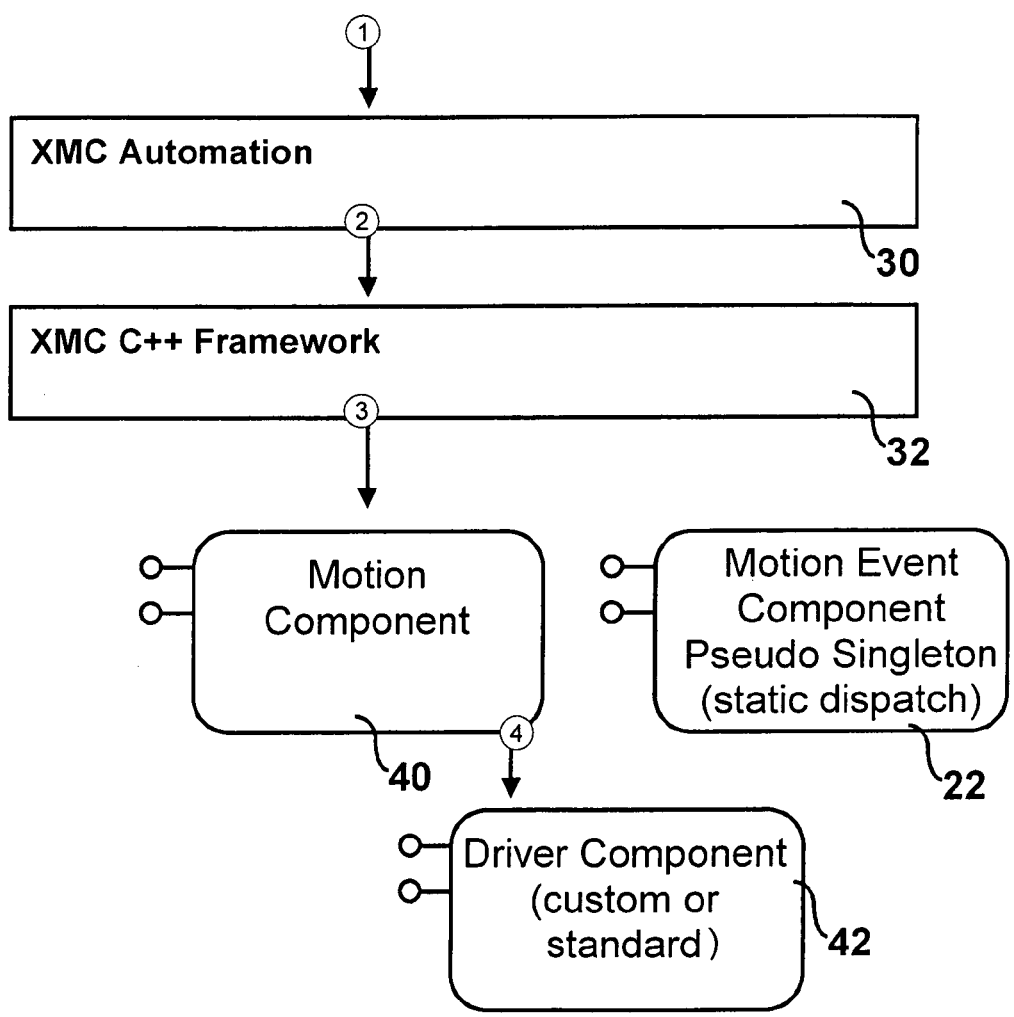
FIG. 3 is a scenario map depicting the process of driver event subscription.

Referring now to FIG. 3 of the drawing, the process of driver event subscription will now be described. To receive events, a client must first 'subscribe' to a set of one or more events. Subscribing is the process of notifying the motion event system 20 of the events in which the client has interest. Once subscribed, the event conditions defined by the subscription dictate what triggers the event that then notifies the client of the event. FIG. 3 illustrates how event subscription works.

As shown in FIG. 3, the following steps occur when subscribing to an event:

1. First the client in communication with either of the automation layer 30 or C++ framework layer 32 calls the 'Subscribe' method notifying the system 20 which event or events are to be monitored.
2. If the automation layer 30 is used, it notifies the C++ framework layer 32 of the event subscription.
3. Next, the C++ framework layer 32 notifies the motion component 40 of the event subscription.
4. The motion component 40 then notifies the target driver component 42, which stores the subscription information and then either begins monitoring the event or waits until told to do so.

Optionally, the motion component 40 may implement the event subscription/monitoring functionality, which adds a higher degree of reusability because each of the driver components 42 would not be required to implement any subscription/monitoring logic. Also, because the automation layer 30 and C++ framework layer 32 are provided merely as programming conveniences, the client setting up the subscription may optionally communicate directly to the motion component 40, bypassing both the automation layer 30 and C++ framework layer 32.

Figure 4:
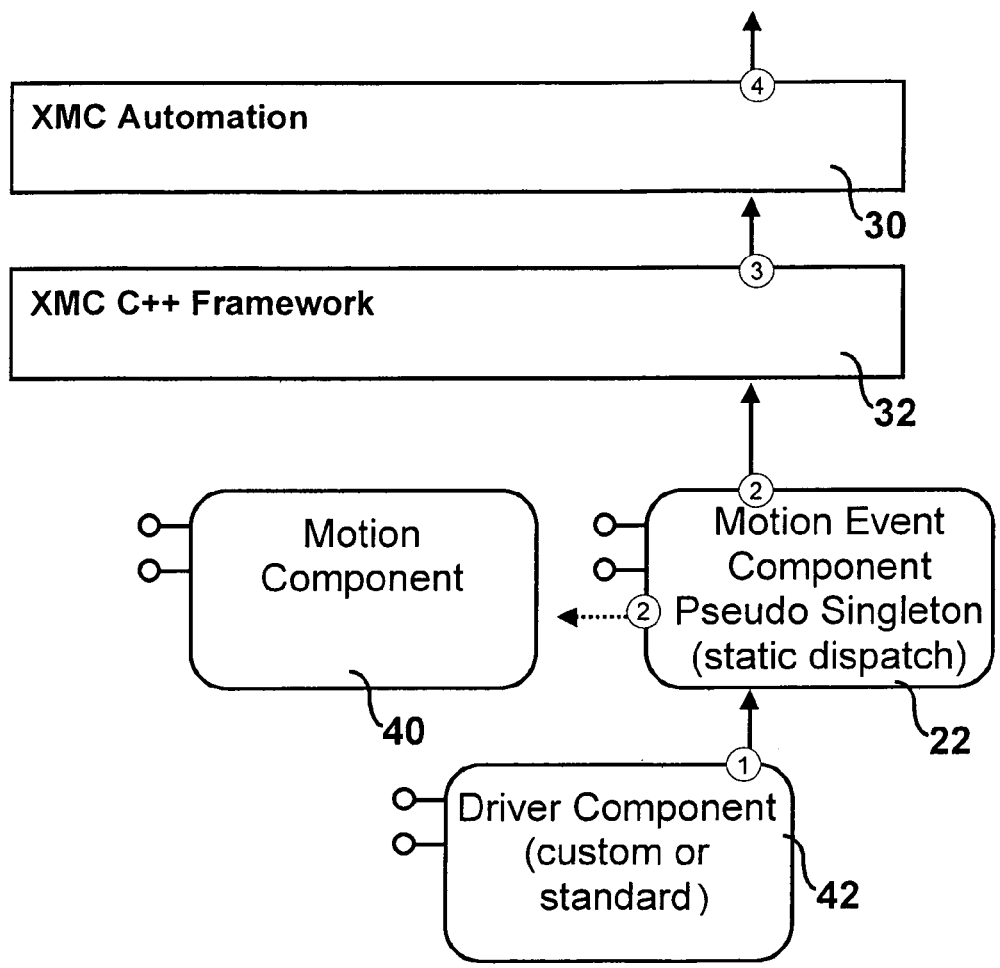
FIG. 4 is a scenario map depicting the making of a driver level event triggering.

Referring now to FIG. 4, the process of driver level event triggering will now be described. An event is generated by either a driver component 42 or stream, which will also be referred to as the event source. When an event occurs, the event source routes the event to subscribed clients the motion event component 22. As shown in FIG. 4, the following steps are performed when an event is generated:

1. First the event condition occurs in the event source. When the event occurs, the event source sends the event notification to the motion event component 22.
2. Next, the motion event component 22 sends the event notification to all clients subscribed to that particular event.
3. If the automation layer 30 is used, the C++ framework layer 32 notifies the automation layer 30 of the event.
4. The automation layer 30 next notifies all appropriate subscribed clients of the event, thereby completing the event cycle.

As an alternate to the design above, the functionality of the motion event component 22 may be provided by the motion component 40, in which case a separate motion event component 22 would not be used. However, using a separate motion event component 22 allows a decoupling of the event source and the event receiver, which may be beneficial when the components of the system 20 are distributed across a network. For example with the motion event component 22, the motion component 40 may actually be located on a different computer connected via a network (Ethernet, wireless, or other network system).

Optionally a motion stream (not shown) residing below the driver component 42 may fire events. For example, data transmission events may be fired by the stream when data is received from or sent to the stream target system. In this case, the event source would be the motion stream instead of the motion driver 42. In addition, as generally discussed above, the motion component 40 may actually implement the event subscription/monitoring/trigger functionality, which would add a higher degree of reusability because each driver would not be required to implement any subscription/monitoring logic. Further, because the automation layer 30 and C++ framework layer 32 are provided merely as programming conveniences, the motion event component 22 may communicate directly with the client application thus bypassing the automation layer 30 and C++ framework layer 32.

Figure 5:
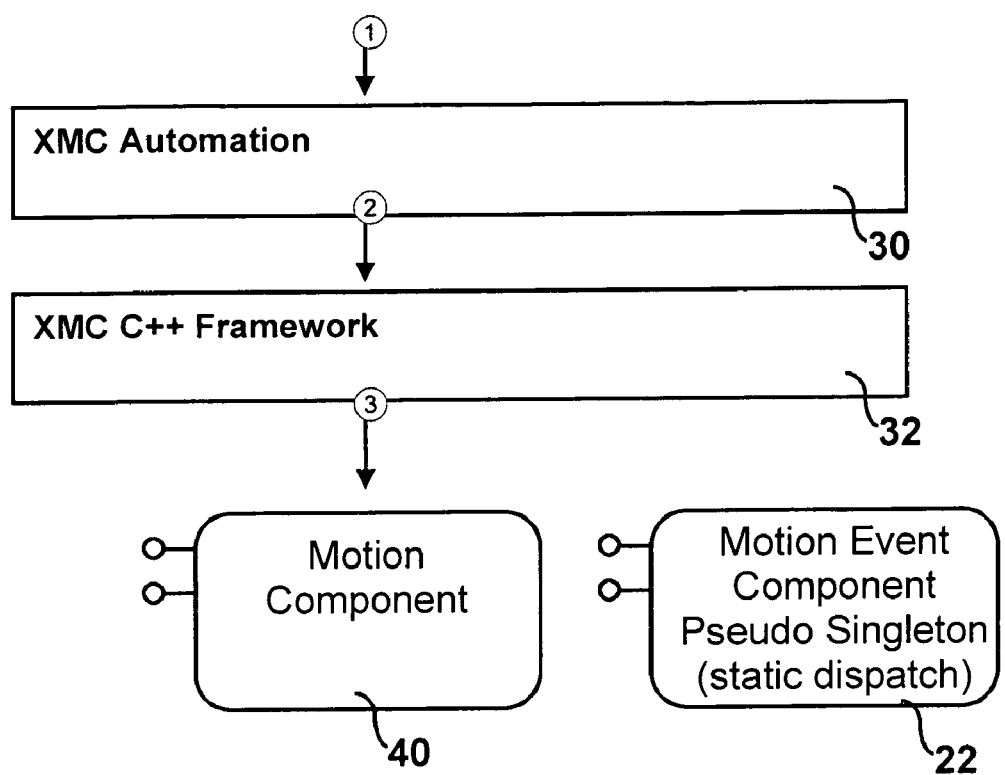
FIG. 5 is a scenario map depicting the process of event subscription at the motion component level.

Referring now to FIG. 5 of the drawing, the optional process of event subscription at the motion component level will now be described. To maximize code re-use across driver implementations, event subscription and monitoring may be implemented at the motion component 40 level instead of at the driver component level. FIG. 5 illustrates the steps that occur when event subscription is handled at the motion component level:

1. Initially, the client (of either the automation layer 30 or C++ framework layer 32) calls the 'Subscribe' method notifying the motion event system 20 of which events to monitor.
2. The automation layer 30, if used, notifies the C++ framework layer 32 of the event subscription.
3. Next, the C++ framework layer 32 notifies the motion component 40 of the event subscription, which in turn stores the subscription information and then either starts monitoring the event immediately or waits until told to do so.

Optionally, because the automation layer 30 and C++ framework layer 32 are provided merely as programming conveniences, the client setting up the subscription may also talk directly to the motion component 40, thus bypassing both the automation layer 30 and C++ framework layer 32.

Figure 6:
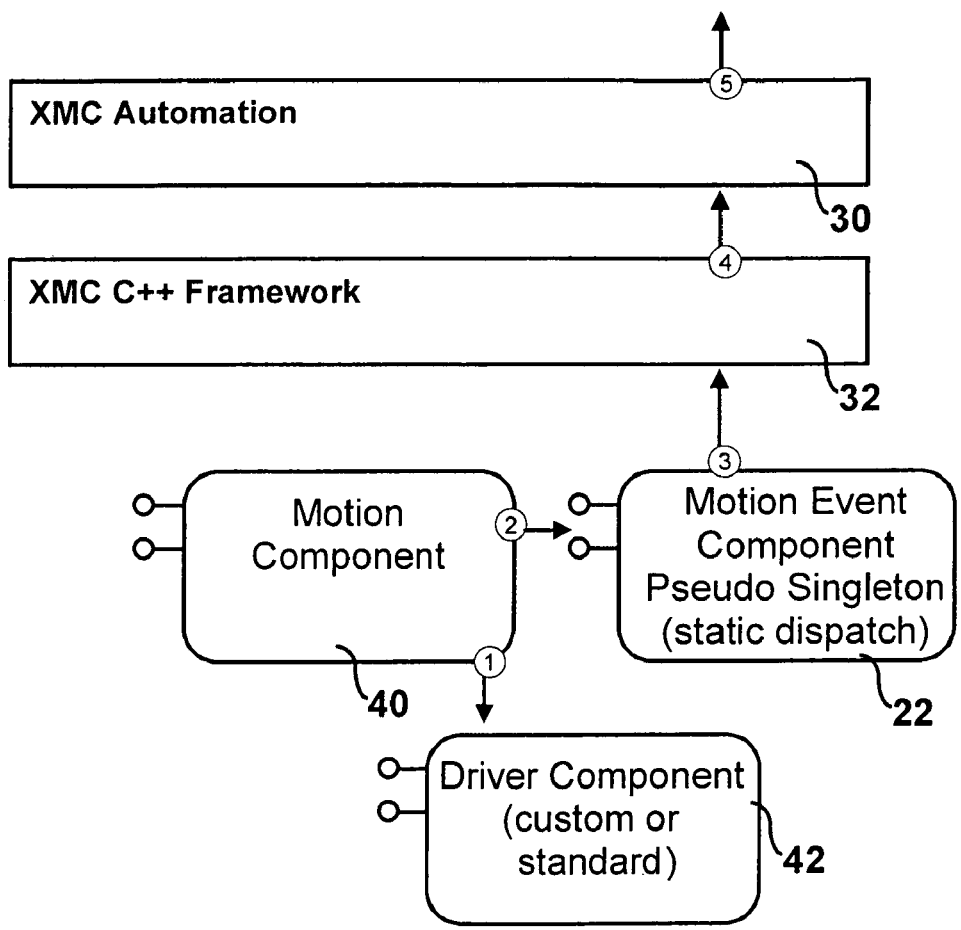
FIG. 6 is a scenario map depicting the event monitoring at the component level.

Referring now to FIG. 6, the process of event monitoring at the component level will now be described. If motion component event monitoring is used and an event occurs, the motion component 40 becomes the event source. Upon detecting an event, the motion component 40 routes the event to subscribed clients through the motion event component 22. The steps that occur when the motion component 40 routes events are as follows:

1. First the motion component 40 monitors the driver component 42 to determine whether any pre-subscribed event conditions occur.
2. Upon detecting a subscribed event condition, the motion component 40 notifies the motion event component 22 of the event.
3. The motion event component 22 then notifies all clients (components, applications or other software) subscribed to the event, that the event has occurred.
4. If the automation layer 30 is used, the C++ framework layer 32 notifies the automation layer 30 of the event.
5. The automation layer 30 then notifies any of its clients of the event, thus completing the event cycle.

Optionally, because the automation layer 30 and C++ framework layer 32 are used as programming conveniences, the motion event component 22 may bypass the automation layer 30 and C++ framework layer 32 and communicate directly with the client application.

Any number of conditions may trigger an event. The following section lists several example event triggers.

Low Level Data Transmission is one example of an event that may be monitored using the motion event monitoring system 20. Very low level events may be used in the motion stream to notify other components when raw data is sent or received to and from the target motion device or machine.

Another example of an event that may be monitored using the event monitoring system 20 is a Motion Action. Certain motion actions may trigger events. For example the completion of a move, hitting a limit switch, or accelerating up to a given velocity may all trigger events that notify the client of the event condition.

The event monitoring system 20 may be used to monitor events triggered by changing data values. More specifically, a controller may define variables that are associated with or contain data values; as the data values associated with these variables change, one or more events may be triggered. For example, the motion driver 42 may poll for variables having data values and, upon seeing a change in value or state of a data value, the driver 42 may fire an event to other components notifying them of the change. This model implemented by the motion event monitoring system 20 follows a publish/subscribe model where the driver 42 "publishes" data changes to "subscribing" components such as the automation layer 30 or any client software using the system 20.

A. Example C++ Functions

The following discussion describes C++ functions that may be used by the motion event system 20 to support event notifications on data and API changes. The example system 20 uses an object, referred to as CSystemMonitorObj, to implement an internal thread to monitor variables and other API's. Using this example object, once each API changes, registered call back functions are called, thereby notifying the target of the data changes.

The CSystemMonitorObj object uses the following functions to support event notifications: Subscribe, Unsubscribe, Initialize, and CleanUp. The Subscribe function adds a new function call-back to be called on data changes. The Unsubscribe function removes a function from the call-back set. The Initialize function creates a connection to the motion event component 22. The CleanUp function shuts-down any connections to the motion event component 22. Each of these functions will be discussed separately below.

1. CSystemMonitorObj::Subscribe Function

The "Subscribe" function is used to add a new variable or API to the subscription list and employs the following syntax, parameters, and return value:

| | |
|---|---|
| Syntax | HRESULT Subscribe( DWORD dwType,<br>DWORD dwTypeInfo,<br>LPFNMotionEVENT pfnCallBack,<br>LPVOID pvParam,<br>LPDWORD pdwCookie ); |
| Parameters | DWORD dwType - this parameter specifies the type of data where the following types are currently supported:<br>MOTION_CNC_MONITOR_TYPE_VARIABLE - variable monitor type, were the dwTypeInfo points to a string containing the variable name. Note when monitoring this type, only mapped Motion variables are supported.<br>DWORD dwTypeInfo - contains extra information describing the type of data to be monitored.<br>LPFNMOTIONEVENT pfnCallBack - callback function called when the data monitored changes. This function has the following prototype.<br>HRESULT (*LPFNMOTIONEVENT)( DWORD dwType,<br>DWORD dwTypeInfo,<br>LPVOID pvParam,<br>MOTION_PARAM_DATA rgData,<br>DWORD dwCount );<br>LPVOID pvParam - extra parameter passed to the callback upon invocation.<br>LPDWORD pdwCookie - pointer to a DWORD where the cookie (value associated with the connection) is copied. |
| Return Value | HRESULT - NOERROR on success, or error code on failure. |

2. CSystemMonitorObj:: Unsubscribe Function

The Unsubscribe function Removes a variable or API from the subscription list and employs the following syntax, parameters, and return value:

| | |
|---|---|
| Syntax | HRESULT Unsubscribe( DWORD dwCookie ); |
| Parameters | DWORD dwCookie-value corresponding to the connection (previously returned by the Subscribe function). |
| Return Value | HRESULT-NOERROR on success, or error code on failure. |

3. CSystemMonitorObj::Initialize Function

The "Initialize" function creates a connection to the motion event component 22 and employs the following syntax, parameters, and return value:

| | |
|---|---|
| Syntax | HRESULT Initialize( DWORD dwFlags ); |
| Parameters | DWORD dwFlags-reserved for future use, should be set to zero. |
| Return Value | HRESULT-NOERROR on success, or error code on failure. |

4. CSystemMonitorObj::CleanUp Function

The "CleanUp" function releases the connection to the motion event component 22 and employs the following syntax and return value:

| | |
|---|---|
| Syntax | HRESULT CleanUp( void ); |
| Return Value | HRESULT-NOERROR on success, or error code on failure. |

The following C++ functions are examples of functions that may be used by the motion event system 20 to support event notifications that may be implemented in the automation layer 30. The functions described below apply to direct events supported using standard connection points as well as "lazy events", which are loosely coupled events implemented using COM+ events.

B. Internal SystemAPI Definitions

The event functionality described above is implemented internally to the event management system 20 using a set of SystemAPI or SystemSPI functions. The term "SystemAPI" refers to an application programming interface exposed by the system 20. The term "SystemSPI" refers to a service provider interface defined by the system 20.

When event functionality is implemented at the level of the motion component 40, the SystemAPI definitions are used. When event functionality is implemented at the level of the driver component 42, the events are passed down to the driver component 42 and handled by the SystemSPI definitions.

All data passed to the SystemAPI is passed in the form of a function index called the SystemAPI index and an array of parameters (RgData) that use a Standard Motion Parameter Data Type that will be described in further detail below.

In the following discussion, portions of the SystemAPI and SystemSPI provided to handle event management will be defined.

1. MOTION_CNC_EVENT_SUBSCRIBE API

The MOTION_CNC_EVENT_SUBSCRIBE API is a SystemAPI that is used to subscribe to a given event condition. In the present example, only variables are supported by the event notification. The present invention may be implemented using events that include motion conditions, raw data transmission conditions, or other state change information occurring either in the motion event system 20 or on the target device or machine. The following Index Value and RgData Values are used to implement this API:

| | |
|---|---|
| Index Value | 2890 |
| RgData[0] | (in, number) type of event to monitor. Current types supported are:<br>XMC_CNC_MONITOR_TYPE_VARIABLE-variable monitor type, were the RgData[1] points to a string containing the variable name. Note when monitoring this type, only mapped XMC variables are supported. |
| RgData[1] | (in, number or string depending on RgData[0])-actual type information describing the event condition to be monitored. For example when RgData[0] = XMC_CNC_MONITOR_TYPE_VARIABLE, this field contains the actual variable name to monitor. |

-continued

| | |
|---|---|
| Index Value | 2890 |
| RgData[2] | (in, number) number of event conditions to monitor. For each count of event conditions to monitor, there are two elements in the RgData array that follow (one for the event condition type and one for the actual event condition value). |
| RgData[2 + (1 * n)] | (in, number) event condition type where the following types are supported:<br>XMC_CNC_EVENTCONDITION_DATA_CHANGE-any data changes in the data type above will trigger the event.<br>XMC_CNC_EVENTCONDITION_DATA_EQUAL<br>XMC_CNC_EVENTCONDITION_DATA_LESSTHAN<br>XMC_CNC_EVENTCONDITION_DATA_GREATERTHAN<br>XMC_CNC_EVENTCONDITION_DATA_AND<br>XMC_CNC_EVENTCONDITION_DATA_OR<br>Each of the conditions above are used in a combined manner. Where the logical condition (=, <, >) are applied for each type respectively.<br>For example, in an array that contains the following items:<br>rgData[2] = 4 (4 condition values)<br>rgData[3] = XMC_CNC_EVENTCONDITION_EQUAL<br>rgData[4] = 3.0<br>rgData[5] = XMC_CNC_EVENTCONDITION_LESSTHAN<br>rgData[6] = 3.0<br>rgData[7] = XMC_CNC_EVENTCONDITION_OR<br>rgData[8] = 1.0<br>rgData[9] = XMC_CNC_EVENTCONDITION_GREATERTHAN<br>rgData[10] = 5.0<br>the array would be evaluated using the following logic:<br>If (DATA <= 3.0 OR DATA > 5.0) then Trigger Event |
| RgData[0] | (out, number) the cookie (unique identifier) associated with the subscription is returned to the client. |

2. MOTION_CNC_EVENT_UNSUBSCRIBE API

The MOTION_CNC_EVENT_UNSUBSCRIBE API is a SystemAPI that is used to unsubscribe to a given event condition, thus removing the condition from the monitoring list for the specific client making the unsubscribe request. The event condition will still be monitored if other clients are currently subscribed to the condition. The following Index Value and RgData Values are used to implement this API:

| | |
|---|---|
| Index Value | 2891 |
| RgData[0] | (in, number) cookie (unique identifier) associated with the subscription. This value is returned to the client when calling the subscription SystemAPI above. |

3. MOTION_CNC_EVENT_PAUSE API

The MOTION_CNC_EVENT_PAUSE API allows monitoring of the given event condition to be paused for the given client but does not remove it from the subscription list. The following Index Value and RgData Values are used to implement this API:

| Index Value | 2892 |
|---|---|
| RgData[0] | (in, number) cookie value (unique identifier) associated with the subscription. |

The Standard Motion Parameter Data Type discussed briefly above will now be discussed in further detail. The structure of the Standard Motion Parameter Data Type is referred to as MOTION_PARAM_DATA. Many methods on the Motion C++ classes use the standard Motion parameters set to describe data used to control, query or set each axis. The standard parameters are in the following format:

pObj->method(LPMOTION_PARAM_DATA
  rgParamData,DWORDdwCount);

Each element in the rgParamData array corresponds to an axis in the system, with the first element in the array corresponding to the first axis of motion. For example, if the first axis of motion is the 'X' axis, then 'X' axis would correspond to the first element in the array.

The MOTION_PARAM_DATA structure can contain either a numerical or a string value and is defined as follows:

```
typedef struct tagMOTION_PARAM_DATA
{
  LNG_PARAM_DATATYPE adt;
  union
  {
    double df;
    LPTSTR psz;
  };
}MOTION_PARAM_DATA;
```

The 'adt' member of the MOTION_PARAM_DATA structure describes the data contained within the MOTION_PARAM_DATA structure. The values are described below:

| LNG_PARAM_DATATYPE | Description |
|---|---|
| LNG_ADT_NUMBER | Use this value when passing a numerical value via the 'adt' member of the MOTION_PARAM_DATA structure. |
| LNG_ADT_STAT_STRING | Use this value when passing a static string value via the 'psz' member of the MOTION_PARAM_DATA structure. Static strings do not need to be freed from memory. |
| LNG_ADT_MEM_STRING | Use this value when passing a string value via the 'psz' member of the MOTION_PARAM_DATA structure. LNG_ADT_MEM_STRING denotes that the string must be freed from memory during cleanup. |
| LNG_ADT_NOP | This value is used to ignore items within the MOTION_PARAM_DATA array. For example, if you need to command move-at-velocity for only the third axis of a three axis machine, you would send an MOTION_PARAM_DATA array to CSystemMotionObj::MoveAtVelocity where the first 2 elements would be of type LNG_ADT_NOP and the third element would be of type LNG_ADT_NUMBER. The motion component 40 would then issue the move-at-velocity command only to the third axis, ignoring the first two. |

The system 20 handles Boolean types in the following manner. When querying and setting boolean TRUE/FALSE values, any non-zero value is considered TRUE and any zero value is considered FALSE. For example, if the df field of an MOTION_PARAM_DATA array element is non zero and it is sent to CSystemMotionObj::LimEnableSW, the software limits for the specified axis will be enabled.

II. Variable Support System

Typically, the variables associated with a motion system change as the motion system changes state. Events generated by motion systems are often associated with these changing variables. Referring now to FIGS. 7–16, depicted therein is a variable support system 120 for facilitating access to and mapping of motion variables. The system 120 is of particular significance when used in conjunction with the motion event handling system 20 described above, but also has application to motion systems that do not incorporate the motion event handling system 20.

Referring now to FIG. 9, that figure illustrates that the example variable support system 120 comprises the automation layer 30, framework layer 32, motion component 40, and driver components 42 as generally described above. In addition, as depicted in FIG. 9, the variable support system 120 comprises client software 122, a user 124, and a driver administrator component 128. The motion event component 22 is not shown in FIG. 9 for clarity but may also be used by the system 120.

The objects forming the variable support system 120 will be described in further detail below after a discussion of an object model associated with the variable support system 120.

A. Example Object Model

Figure 7:
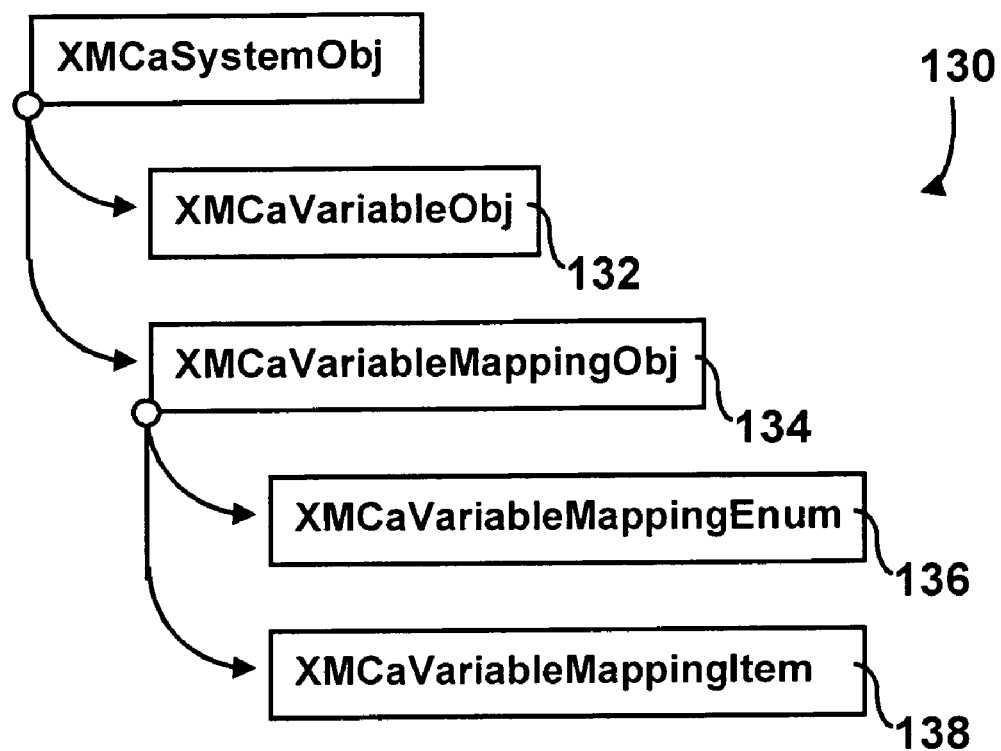
FIG. 7 is a representation of an object model illustrating relationships among objsects of a variable support system of the present invention.

Referring now to FIG. 7 of the drawing, depicted therein is an object model 130 illustrating the relationships among a plurality of objects associated with the example variable support system 120. As shown in FIG. 7, the object model 130 illustrates that the example object model 122 comprises the following variable support objects:

A MotionaVariableObj object 132 is the main object used for variable access. Variables are read and written from this object. In addition, a list of text variable names, as well as the general attributes for each variable, can be queried from this object;

A MotionaVariableMappingObj object 134 used to map each variable name to the internal representation of the variable on the controller of a given motion device.

A MotionaVariableMappingEnum object 136 that enumerates all variable mappings configured by the user 124 as well as those provided by the motion component 40.

A MotionaVariableMappingItem object 138 that represents a single variable mapping where the mapping consists of the following "name"→"mapping".

FIG. 9 of the drawing depicts an example of how the variable support objects described below may be used in the context of Microsoft Visual Basic.

The MotionaVariableObj object 132, MotionaVariableMappingObj object 134, MotionaVariableMappingEnum object 136, and MotionaVariableMappingItem object 138 each expose methods, and the methods exposed by each of the objects 132 and 134 will be described separately below.

1. MotionaVariableObj Object

The MotionaVariableObj 132 supports or exposes the following methods: ReadItem, Read, WriteItem, Write, GetNames, and GetAttributes. The ReadItem method reads a single variable (or array element) and returns the data read. The Read method reads a set of items. The WriteItem methods writes a set of items. The GetNames method returns the list of variable names currently mapped either by the motion component 40 or by the user 124. The GetAttributes method returns the attributes for a given variable. Each of these methods will be separately described in further detail below.

The MotionVariableObj.ReadItem method employs the following syntax, parameters, and return value to read a variable item and return the data read:

| | |
|---|---|
| Syntax | Function ReadItem( strName As String ) As Variant |
| Parameters | strName As String - string containing the name of the variable to be read. |
| Return Value | Variant - data read from the variable. |

The MotionaVariableObj.Read method employs the following syntax and parameters to read a variable item or array and return the data read in the parameter passed:

| | |
|---|---|
| Syntax | Sub Read( strName as String, ByVal rgData( ) As Variant ) |
| Parameters | strName As String - name of variable to read. |
| | rgData( ) as Variant - array of data items read. |
| Return Value | None. |

The MotionaVariableObj.WriteItem method employs the following syntax and parameters to write a variable item to the controller of a given motion device:

| | |
|---|---|
| Syntax | Sub WriteItem( strName As String, varData As Variant ) |
| Parameters | strName As String - string containing the name of the variable to be read. |
| | varData As Variant - data to be written. |
| Return Value | None. |

The MotionaVariableObj.Write method employs the following syntax and parameters to write a variable item or array to the controller of a given motion device:

| | |
|---|---|
| Syntax | Sub Write( strName as String, rgData( ) As Variant ) |
| Parameters | strName As String - name of variable to read. |
| | rgData( ) as Variant - array of data items to be written. |
| Return Value | None. |

The MotionaVariableObj.GetNames method employs the following syntax and parameters to get the variable names for a given domain (this method supports both variables mapped in the motion component 40 and variables mapped by the user 124 using a variable mapping API):

| | |
|---|---|
| Syntax | Sub GetNames( strDomain As String, strName as String, rgData( ) As Variant ) |
| Parameters | strDomain as String - name of domain (if any) from which variables are to be read. |
| | strName As String - name of first variable to retrieve. |
| | rgData( ) as Variant - array of data items to be written. |
| Return Value | None. |

The MotionaVariableObj.GetAttributes method uses the following syntax and parameters to get the attributes for a given variable:

| | |
|---|---|
| Syntax | Sub GetAttributes( strName as String, rgData( ) As Variant ) |
| Parameters | strName As String - name of first variable to retrieve. |
| | strAttrib as String - attributes for the variable. |
| Return Value | None. |

2. MotionaVariableMappingObj Object

The MotionaVariableMappingObj object 134 supports or exposes the following methods: AddMapping, RemoveMapping, RemoveAll, GetMappingList, LoadMappings, and SaveMappings. The AddMapping method adds a new mapping to the list. The RemoveMapping method removes a mapping from the list. The RemoveAll method removes all mappings from the list. The GetMappingList method retrieves the mapping enumerator. The LoadMappings method loads a persisted mapping set. The SaveMappings method saves a mapping set to persisted storage. Each of these methods will be separately described in further detail below.

The MotionaVariableMappingObj.AddMapping method employs the following syntax and parameters to add a new mapping to the mapping list:

| | |
|---|---|
| Syntax | Sub AddMapping( strName As String, strMap As String ) |
| Parameters | strName As String - string containing the name of the variable to be mapped. |
| | strMap As String - string containing the mapping information for the variable. |
| Return Value | None. |

The mapping format for a variable is as follows:

DOMAIN:VARNAME:VARPATH:VARWRITEFMT where "DOMAIN" refers to the domain name on the controller, "VARNAME" the variable name on the controller to be read, "VARPATH" is the variable path (for arrays and structures) of the variable, and "VARWRITEFMT" is the variable write format used when writing data to the variable. A semicolon ':' separates each of the items in the mapping. If the item is empty, the semicolons must still appear. Several example mappings are as follows:

"FOO"→"APC1 MULTI_SETUP:(0):(0){14}"

"BOO"→":PI_TOOL_DATA_TABLE:(0)(1).tool-_length:(1)(1)[{14}]"

The MotionaVariableMappingObj.RemoveMapping method employs the following syntax and parameters to remove a mapping from the mapping list:

| | |
|---|---|
| Syntax | Sub RemoveMapping( strName As String ) |
| Parameters | strName As String - string containing the name of the variable to be removed from the mapping list. |
| Return Value | None. |

The MotionaVariableMappingObj.RemoveAll method employs the following syntax to remove all mappings from the mapping list:

| | |
|---|---|
| Syntax | Sub RemoveAll( ) |
| Parameters | None. |
| Return Value | None. |

The MotionaVariableMappingObj.LoadMappings method employs the following syntax and parameters to load a set of mappings from a file:
Syntax Sub LoadMappings(strFile As String)
Parameters strFile as String—name of file from which the mappings are to be loaded.
Return Value None.

When using the MotionaVariableMappingObj-.LoadMappings method to load mappings from a file, all existing mappings are deleted.

The MotionaVariableMappingObj.SaveMappings method employs the following syntax and parameters to save a set of mappings to file.

| | |
|---|---|
| Syntax | Sub SaveMappings( strFile As String ) |
| Parameters | strFile as String - name of file from which the mappings are to be saved. |
| Return Value | None. |

The MotionVariableMappingObj.GetMappingList method employs the following syntax, parameters, and return value to Retrieve a variable mapping enumerator.

| | |
|---|---|
| Syntax | Function GetMappingList( strDomain as String ) As Object |
| Parameters | strDomain as String - name of the domain for which the enumerator is to enumerate. When empty all variables are enumerated. Currently the following domains are supported: XMC - all variables mapped in the XMC Motion Administrator. user 124 - all user 124 mapped variables using the Mapping API. |
| Return Value | Variable Enumerator. |

3. Driver Component Implementation

The function index and parameter signature for each function used by the variable support objects 130 will now be described in further detail. In particular, the parameter signature and function indices used by the various driver component 42 functions to implement the new variable support will now be discussed.

The MOTION_CNC_VARIABLE_READ function employs the following Index value and RgData values to read a mapped variable:

| | |
|---|---|
| Index Value | 2870 |
| RgData[0] | (in, string) mapped variable name. |
| RgData[1] | (in, out, number) max elements to read in, number read out. |
| RgData[2 . . . ] | (out) data read |

The MOTION_CNC_VARIABLE_READ function employs the following Index value and RgData values to write a mapped variable:

| | |
|---|---|
| Index Value | 2871 |
| RgData[0] | (in, string) mapped variable name. |
| RgData[1 . . . ] | (in) data to write. |

The MOTION_CNC_VARIABLE_LIST_GET function employs the following Index value and RgData values to get the list of mapped values:

| | |
|---|---|
| Index Value | 2872 |
| RgData[0] | (in, string) domain (XMC, USER, empty) XMC - all XMC variables mapped in Motion Admin. USER - all user 124 variables mapped with Mapping API. empty - all variables (XMC + USER). |
| RgData[1] | NOT USED - (in, string) first variable to start the list. |
| RgData[2] | (in, out, number) max variables to query in, actual number queried out. |
| RgData[3 . . . ] | (out, string) list of variable names. |

The MOTION_CNC_VARIABLE_ATTRIB_GET function employs the following Index value and RgData values to get the attributes describing a given mapped variable:

| | |
|---|---|
| Index Value | 2873 |
| RgData[0] | (in, string) mapped variable name. |
| RgData[1] | (out, string) attributes of the variable. |

The MOTION_CNC_VARIABLE_ADDMAPPING function employs the following Index value and RgData values to add a user 124 defined variable mapping.

| | |
|---|---|
| Index Value | 2850 |
| RgData[0] | (in, string) variable name to be mapped. |
| RgData[1] | (in, string) variable mapping using the following format: DOMAIN:VARNAME:VARPATH:VARWRITEFMT DOMAIN - controller domain. VARNAME - variable name on controller. VARPATH - variable path (used for arrays and structures). VARWRITEFMT - format of the variable data written to HW. |

The MOTION_CNC_VARIABLE_REMOVEMAPPING function employs the following Index value and RgData values to remove a specific variable mapping:

| | |
|---|---|
| Index Value | 2851 |
| RgData[0] | (in, string) mapped variable name. |

The MOTION_CNC_VARIABLE_REMOVEALLMAPPINGS function employs the following Index value and RgData values to remove all variable mappings:

| | |
|---|---|
| Index Value | 2852 |
| No params | |

The MOTION_CNC_VARIABLE_MAPPINGCOUNT_GET function employs the following Index value and RgData values to get the number of variable mappings:

| | |
|---|---|
| Index Value | 2853 |
| RgData[0] | (out, number) number of variable mappings. |

The MOTION_CNC_VARIABLE_MAPPING_GETAT function employs the following Index value and RgData values to get the variable mapping settings:

| | |
|---|---|
| Index Value | 2854 |
| RgData[0] | (in, number) variable mapping index to query. |
| RgData[1] | (out, string) variable name at the index specified. |
| RgData[2] | (out, string) variable mapping at the index specified. |

The MOTION_CNC_VARIABLE_MAPPING_SETAT function employs the following Index value and RgData values to change the settings of a variable mapping:

| | |
|---|---|
| Index Value | 2855 |
| RgData[0] | (in, number) variable mapping index. |
| RgData[1] | (in, string) variable name for the mapping at the index (Cannot change from the original name, only used for verification.) |
| RgData[2] | (in, string) new variable mapping for the variable. |

The MOTION_CNC_VARIABLE_LOAD_MAPPINGS function employs the following Index value and RgData values to load a set of variable mappings:

| | |
|---|---|
| Index Value | 2857 |
| RgData[0] | (in, string) name of the file to load. |
| RgData[1] | (in, number, optional) flags for the load operation. |

The MOTION_CNC_VARIABLE_SAVE_MAPPINGS function employs the following Index value and RgData values to save all variable mappings:

| | |
|---|---|
| Index Value | 2856 |
| RgData[0] | (in, string) name of the file where the mapping info is saved. |
| RgData[1] | (in, number, optional) flags for the load operation. |

The MOTION_CNC_VARIABLE_VALIDATE_MAPPINGS function employs the following Index value to validate all variable mappings:

| | |
|---|---|
| Index Value | 2858 |
| No params | |

The MOTION_CNC_SYSTEM_CONNECT function employs the following Index value and RgData values to connect to the controller:

| | |
|---|---|
| Index Value | 502 |
| RgData[0] | (in, number) channel (1.0, 2.0 or 3.0) |

The MOTION_CNC_SYSTEM_DISCONNECT function employs the following Index value and RgData values to disconnect from the controller:

| | |
|---|---|
| Index Value | 503 |
| RgData[0] | (in, number) channel (1.0, 2.0 or 3.0) |

The MOTION_CNC_DIRECT_VARIABLE_READ function employs the following Index value and RgData values to directly read from a variable on the controller:

| | |
|---|---|
| Index Value | 2803 |
| RgData[0] | (in, number) channel (1.0, 2.0 or 3.0) |
| RgData[1] | (in, string) domain name |
| RgData[2] | (in, string) variable name |
| RgData[3] | (in, string) variable path |
| RgData[4] | (in, number) data format MOTION_VARFMT_STRING_DATA_AND_TYPE (0x00000003) MOTION_VARFMT_STRING_DATA (0x00000001) MOTION_VARFMT_VARIANT (0x00000004) |
| RgData[5 . . . ] | (out) Data read from controller. |

The MOTION_CNC_DIRECT_VARIABLE_WRITE function employs the following Index value and RgData values to directly write to a variable on the controller:

| | |
|---|---|
| Index Value | 2823 |
| RgData[0] | (in, number) channel (1.0, 2.0 or 3.0) |
| RgData[1] | (in, string) domain name |
| RgData[2] | (in, string) variable name |
| RgData[3] | (in, string) variable path |
| RgData[4] | (in, number) data format MOTION_VARFMT_STRING_DATA_AND_TYPE (0x00000003) MOTION_VARFMT_STRING_DATA (0x00000001) MOTION_VARFMT_VARIANT (0x00000004) |
| RgData[5] | Number of items to write. |
| RgData[6] | Data write format for VARIANT type, otherwise the full string containing data write format and comma delimited data. |

The MOTION_CNC_DIRECT_VARIABLE_LIST_GET function employs the following Index value and RgData values to get the list of all variables directly from the controller:

| | |
|---|---|
| Index Value | 2798 |
| RgData[0] | (in, number) channel (1.0, 2.0 or 3.0) |
| RgData[1] | (in, string) domain name |
| RgData[2] | (in, string) variable name |
| RgData[3] | (in, number) data format |
| | MOTION_VARFMT_STRING_DATA_AND_TYPE (0x00000003) |
| | MOTION_VARFMT_STRING_DATA (0x00000001) |
| | MOTION_VARFMT_VARIANT (0x00000004) |
| RgData[4] | (in, number) Number of items to query. |
| RgData[5 . . . ] | (out, string) List of variable names. |

The MOTION_CNC_DIRECT_VARIABLE_ATTRIB_GET function employs the following Index value and RgData values to get the attributes of a variable directly from the controller:

| | |
|---|---|
| Index Value | 2799 |
| RgData[0] | (in, number) channel (1.0, 2.0 or 3.0) |
| RgData[1] | (in, string) domain name |
| RgData[2] | (in, string) variable name |
| RgData[3] | NOT USED - (in, string) variable name |
| RgData[4] | NOT USED - (in, number) data format |
| | MOTION_VARFMT_STRING_DATA_AND_TYPE (0x00000003) |
| | MOTION_VARFMT_STRING_DATA (0x00000001) |
| | MOTION_VARFMT_VARIANT (0x00000004) |
| RgData[5] | (out, string) String containing the attributes. |

B. Controller Independent Variables

Currently, various methods of implementing variables are used within control technologies. Typically each vendor has a proprietary manner of specifying each variable and how it is accessed. The variable support system 120 may use what will be referred to herein as Independent Variables to facilitate access to any variable no matter how the variable is actually implemented by the control vendor. The Independent Variables may be independent of the particular hardware or software system used. The following discussion will describe an example design for controller neutral variables, including a description of all software modules involved.

Figure 8:
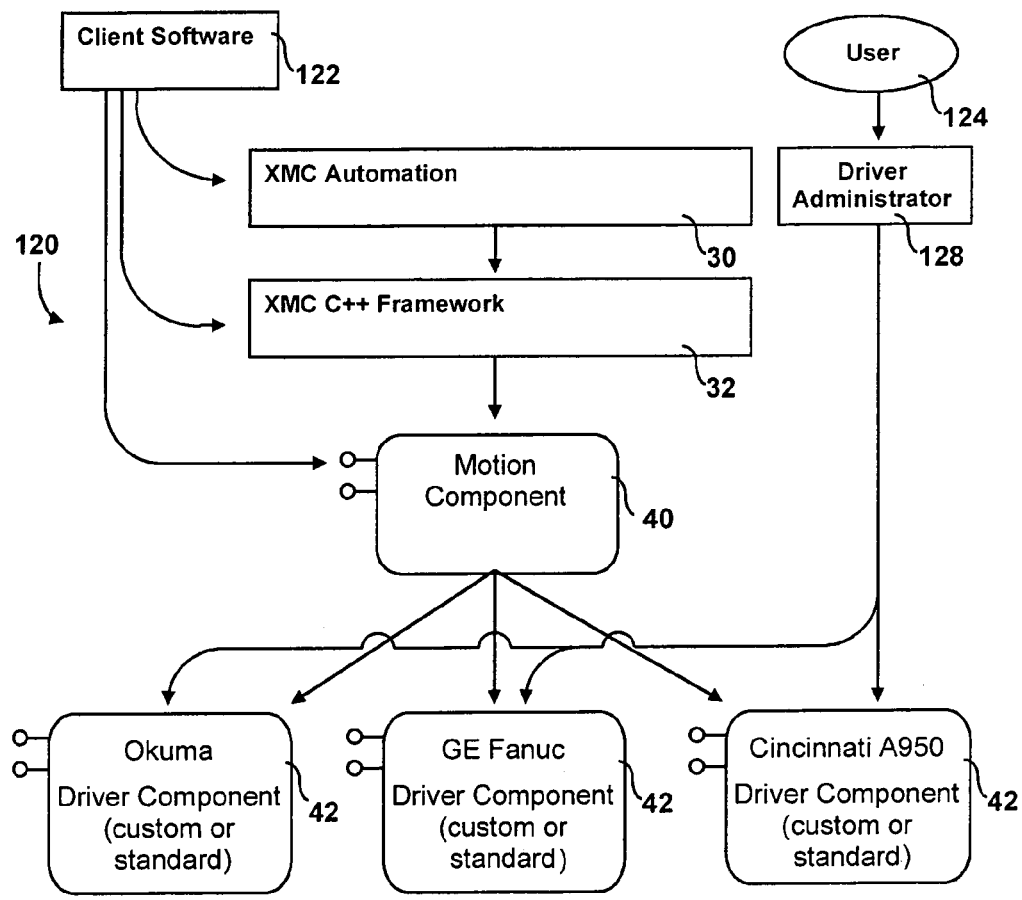
FIG. 8 is a module interaction map depicting a variable support system in the context of a motion system.

Referring for a moment back to FIG. 8, the objects depicted therein are used (some optionally) when setting up and using controller independent variable mappings. Each of the objects depicted in FIG. 8 will now be described in further detail.

The client software 122 is any software that uses the services of the motion component 40 to setup or use controller independent variable mappings. The client may access the motion component 40 via the automation layer 30, the framework layer 32, or directly where the client software 122 communicated directly with the motion component 40.

The example automation layer 30 is provided for programming environments that support Microsoft OLE Automation. Several examples of such programming environments are Microsoft Visual Basic, applications that are VBA (Visual Basic for Applications) aware, the Visual Basic Scripting environment typically used in Internet/Web based HTML pages, and the new Microsoft .NET environment.

The framework layer 32 is provided for programming environments that use the C++ programming language. Microsoft's Visual Studio 6.0 is an example of such an environment.

The motion component 40 services all client requests for mapped variable configuration and usage. The motion component 40 may be accessed directly, such as by the framework layer 32, or indirectly, such as through the automation layer 30. When requested, the motion component 40 routes the request to the active driver component 42 and may be used with a plurality of driver components 42 in a multi control environment.

The driver component 42 implements the specific variable mapping for a specific controller technology. Each variable mapping is setup either programmatically or via the driver administrator component 128.

The driver administrator component 128 is a user 124 application that allows the user 124 to visually configure each variable mapping for each controller dependent driver component 42. All configurations made in the driver administrator component 128 can be done without any new software programming.

The user 124 is the a person who configured the variable mappings and/or a person who runs or otherwise uses client software that internally uses mapped variables.

Several examples of use cases will now be described to illustrate how the variable mapping model implemented by the system 120 may be used. In the examples discussed below, each driver component 42 is responsible for storing and performing any variable transformations between controller neutral and controller specific data.

Each variable mapping for each controller dependent driver component 42 may be mapped and/or otherwise configured in any one of several ways. The examples depicted in FIGS. 10 and 11 describe how an end-user 124 would configure the variable mappings without any additional software programming. Such mappings are configured via a driver administrator 128 that allows the driver component(s) 42 to be configured.

Figure 10:
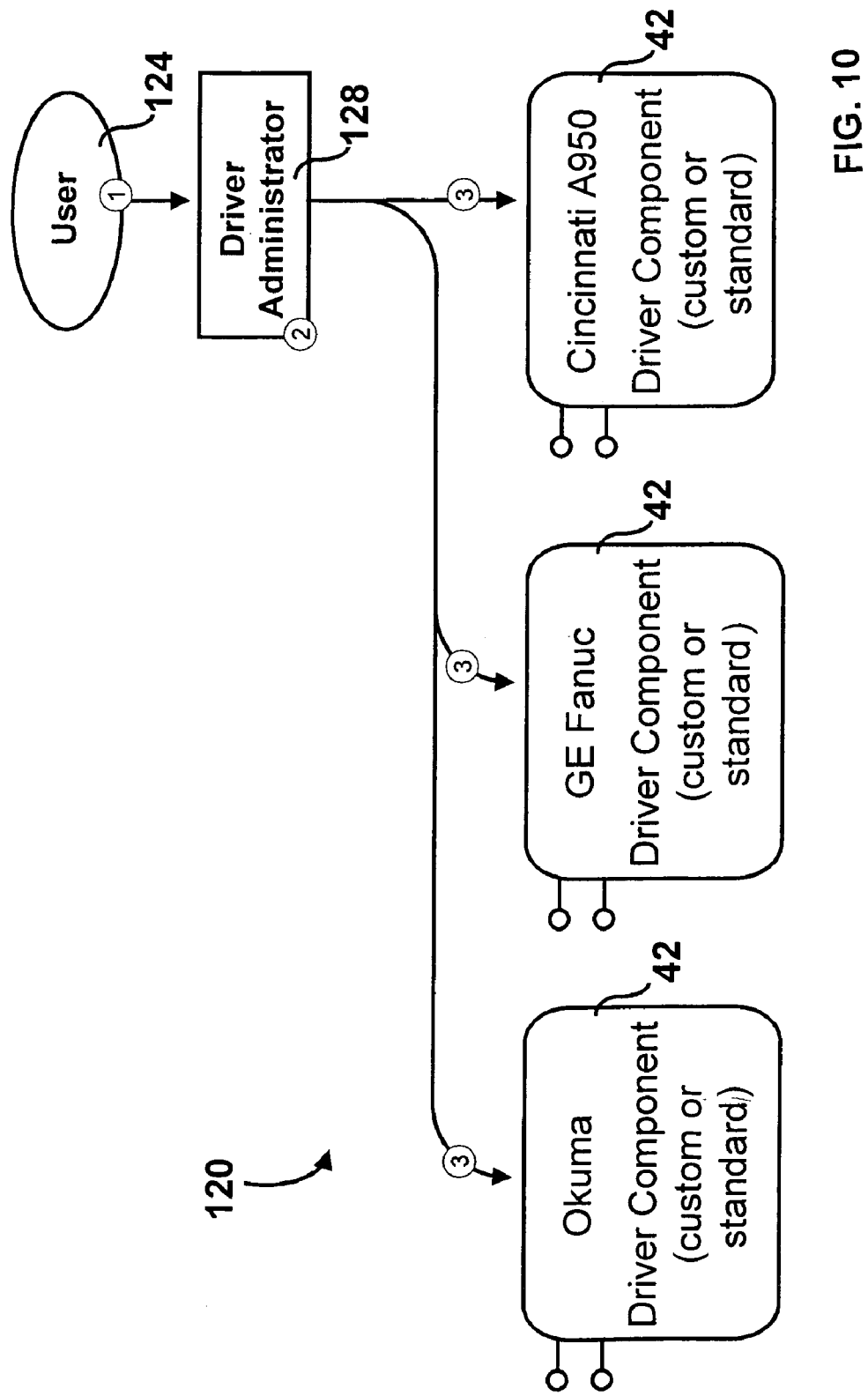
FIG. 10 is a scenario map illustrating the configuration of variable mappings using an administrator component.

Referring initially to FIG. 10, depicted therein is an example of a situation in which the user 124 configures variable mappings with an administrator component the driver administrator component 128. When the user 124 configures variable mappings with the driver administrator 128, the following steps take place:

1. First the user 124 runs the driver administrator component 128 and selects the target driver component 42 for which variable mappings are to be configured.
2. For each target driver component 42, the user 124 enters in the controller dependent information for each controller neutral variable name (or tag). To make the variable controller independent, the same variable name is used and configured within each driver component 42 associated with a controller so that when the variable is later used, the client software 122 using the variable has no need to know any controller dependent information about the mapping. Instead, the variable mapping takes place of the transformation from the controller independent variable name, type, and structure into the controller dependent variable name, type, and structure.
3. The mapping information specific to each driver component 42 is sent to the driver component 42, which in-turn stores the information in a persistent form for later use.

Figure 11:
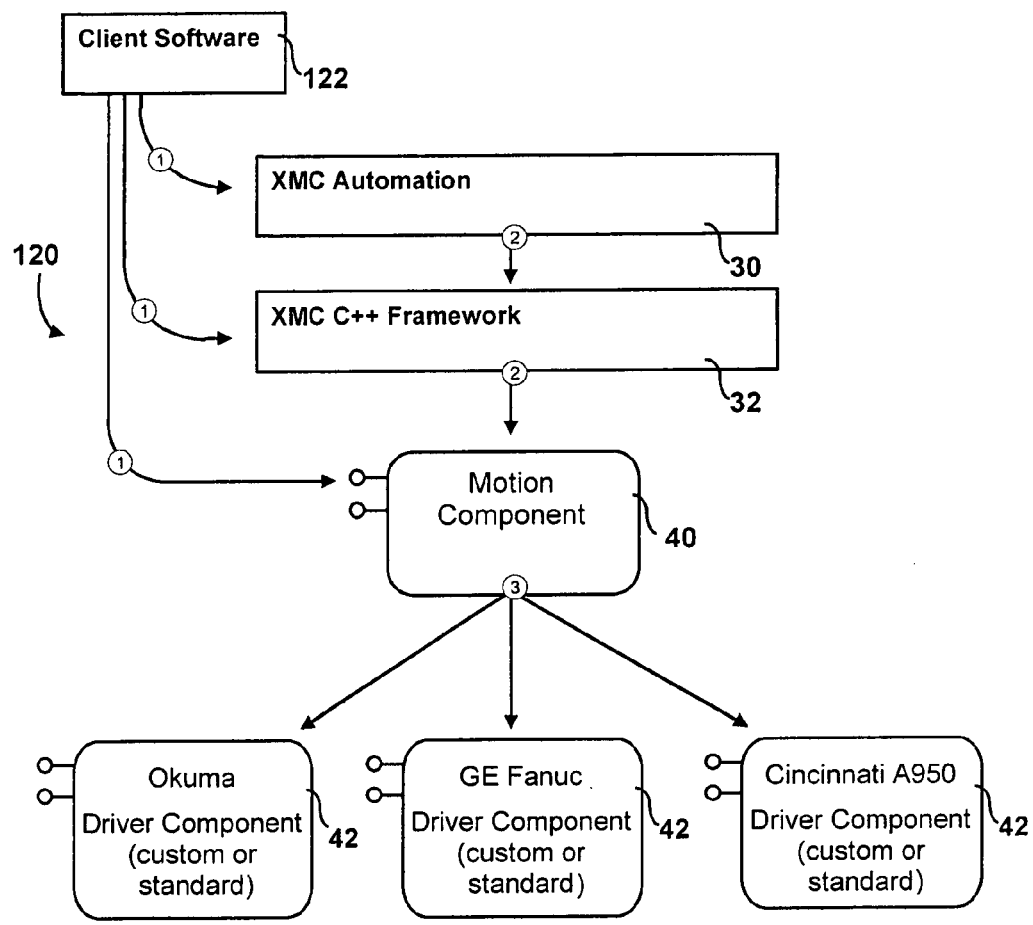
FIG. 11 is a scenario map illustrating the configuration of variable mappings programmatically.

Referring now to FIG. 11, depicted therein is an example of configuring variable mappings programmatically using either the motion component 40 or the driver administrator component 128. FIG. 11 illustrates that the following steps are performed when configuring the motion component 40 programmatically:

1. First the client software 122 programmatically sends the variable mapping information to the motion component 40 either directly or via the framework layer 32 software layers. The motion component 40 is directed to configure the variable mapping for a specific driver component 42.
2. If a framework layer 32 is used, the framework layer 32 relays the information for the variable mapping directly to the motion component 40.
3. Upon receiving the request, the motion component 40 sends the variable mapping information to the target driver component 42, which in turn saves the information for later use when the mapped variable is requested.

As an alternative, the motion component 40 may store the mapping information for each driver component 42 in a mapping database, thus relieving each driver component 42 from having to perform any mapping logic. When a variable is then requested, the motion component 40 would look-up the variable mapping and send the mapped controller dependent information associated with the variable to the target driver component 42. The driver component 42 would then operate on the controller dependent information in a conventional manner.

Figure 13:
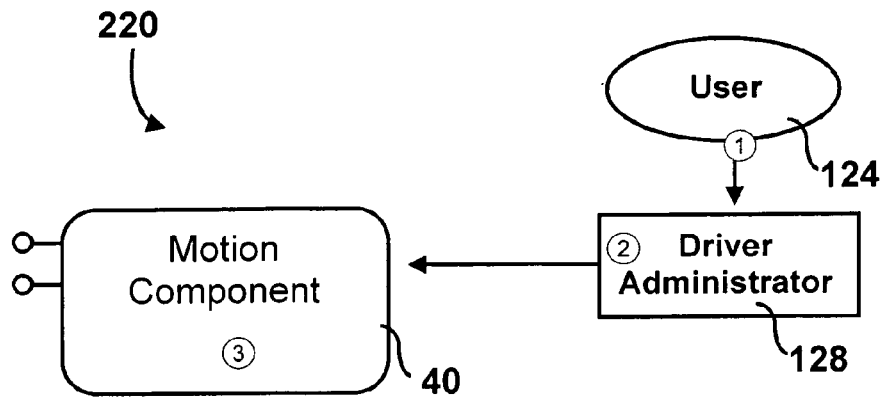
FIG. 13 is scenario map illustrating a variable support system in which mapping and logic is performed by the motion component.

Referring now to FIG. 13, depicted therein is an example of the system 120 using variable mappings. When using variable mappings, the controller independent variable name, type and structure are always used by the client software 122, thus allowing for controller independent use. When the same variable name, type, and structure are configured across several controller dependent technologies, the variable mapping taking place between the controller independent variable information and the controller dependent variable creates the controller independent variable environment.

Figure 12:
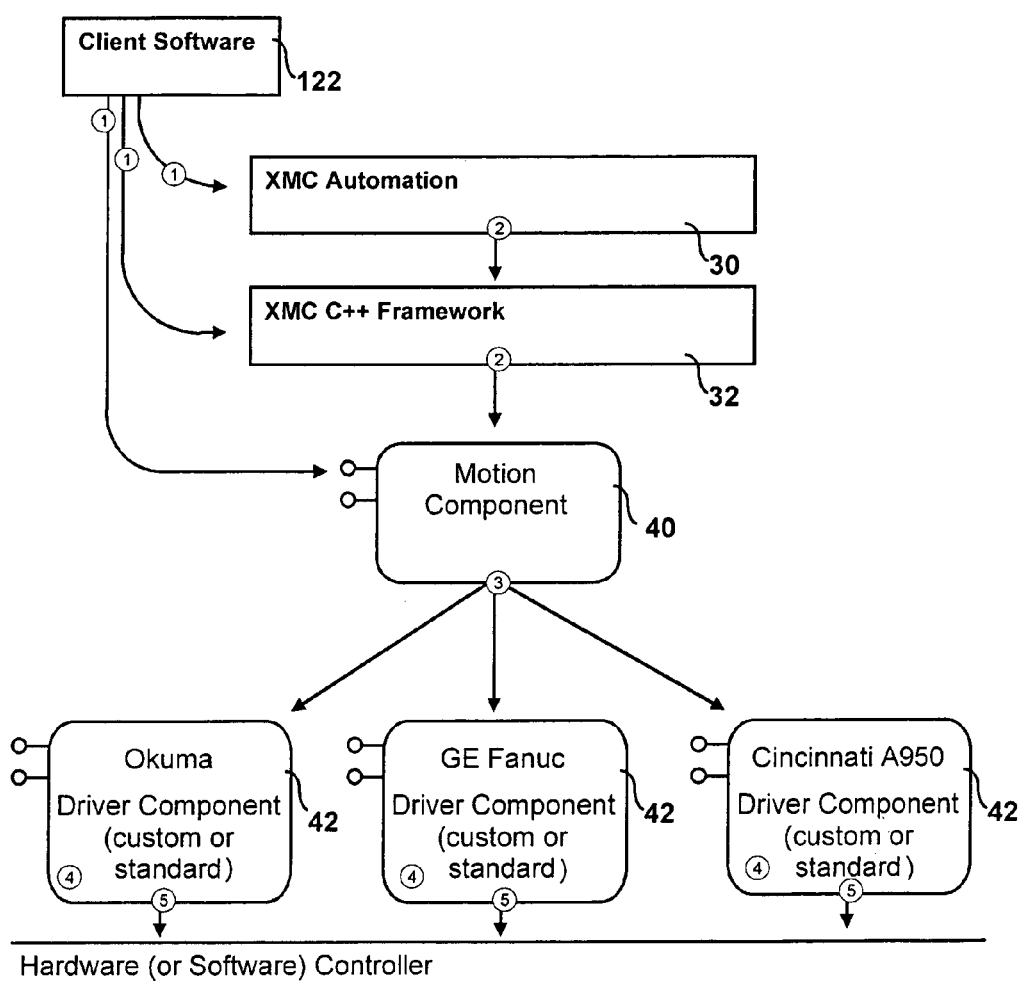
FIG. 12 is a scenario map illustrating the use of the variable support system to map variables.

FIG. 12 illustrates that the following steps occur when using the system 120 to map variables:
1. First the client software 122 programmatically requests an operation to occur on the variable (i.e. read, write, query attributes, etc).
2. The client software may communicate with the motion component 40 direct or via the framework layer 32 layers (which in-turn then communicates with the motion component 40).
3. Upon receiving the variable request, the motion component 40 routes the information directly to the driver component 42 (or driver components 42 in a multi controller environment).
4. Upon receiving the variable request each driver component 42 transforms the controller independent variable information into the controller specific variable information and then performs the variable operation(s) using the controller specific information. Upon receiving any controller specific data from the request (i.e. a read operation), the controller specific data received is then retransformed back into the controller neutral format and returned to the motion component 40.
5. The driver component 42 communicates the request to the target controller, for which it is designed, using the controller specific variable name, format and structure.

Figure 14:
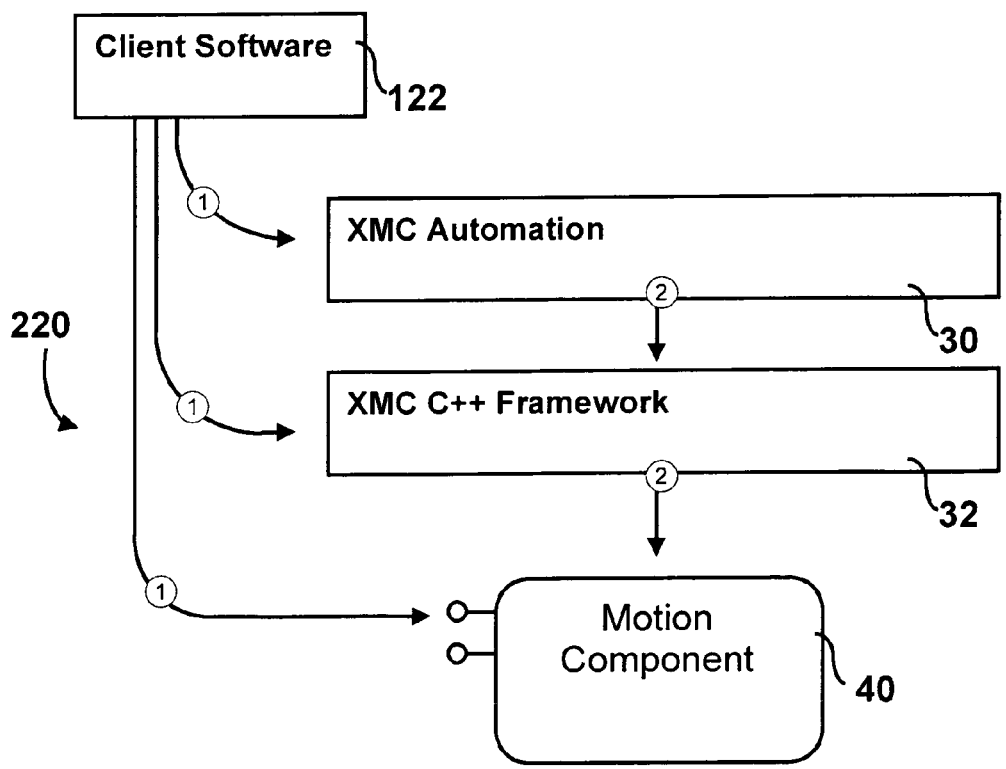
FIG. 14 is a scenario map of the system of FIG. 13 being configured programmatically.
Figure 15:
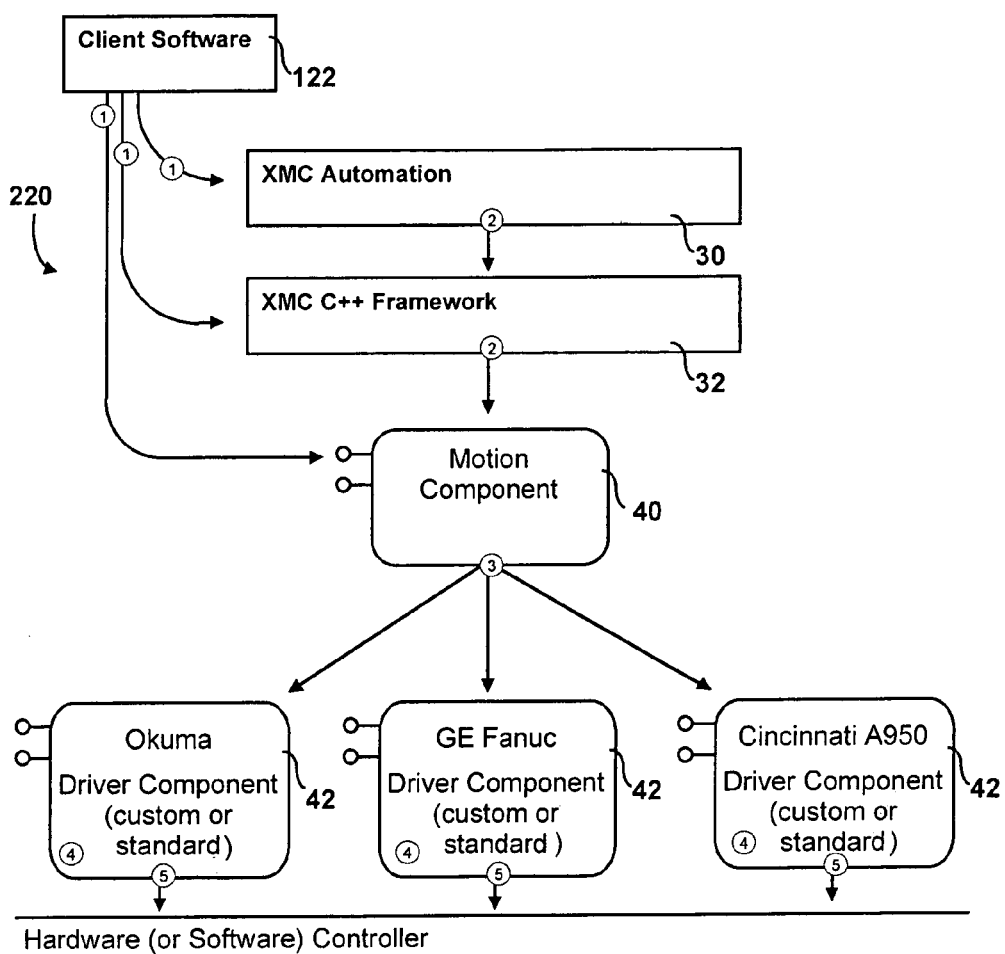
FIG. 15 is a scenario map of the system of FIG. 13 being used to access mapped variables.

Referring now to FIGS. 13–15, described therein is a variable support system 220 that is constructed and operates in a manner that is generally similar system 120 described above. However, in the system 220, all mapping logic and storage is performed by the motion component 40, making each driver component 42 easier and simpler to implement. The system 220 may be referred to as a 'shared' model for the mapping because the variable mapping services are implemented by the motion component 40 and shared among all driver components 42.

Like the system 120, the variable mapping/configuration model implemented by the system 220 may be implemented in several ways. FIG. 13 and the following discussion describes how a user 124 can configure the variable mappings without any additional software programming. Such mappings are configured via the driver administrator component 128. When the user 124 configures variable mappings using the driver administrator component 128, the following steps are performed:
1. First the user 124 runs the driver administrator component 128 and selects the target driver component 42 for which variable mappings are to be configured.
2. For each target driver component 42, the user 124 enters in the controller dependent information for each controller neutral variable name (or tag). To make the variable controller independent, the same variable name is used and configured within each driver component 42 associated with a controller so that when the variable is later used, the client software 122 using the variable has no need to know any controller dependent information about the mapping. Instead, the variable mapping takes place of the transformation from the controller independent variable name, type, and structure into the controller dependent variable name, type, and structure.
3. The mapping information specific to each driver component 42 is sent to the motion component 40 which in turn stores the information in a persistent form for later use.

FIG. 14 illustrates how variable mappings may also be configured programmatically using the motion component 40. When configuring each variable mapping programmatically, the following steps are performed:
1. First the client software 122 programmatically sends the variable mapping information directly to the motion component 40 through the framework layer 32. The motion component 40 is directed to configure the variable mapping for a specific driver component 42.
2. If the framework layer or layers 32 are used, the framework layer(s) relay the information for the variable mapping directly to the motion component 40.
3. Upon receiving the request, the motion component 40 saves the information for later use when the mapped variable is requested.

When using the variable mappings, the client software 122 may use the controller independent variable name, type, and structure to allow for controller independent use. As will be described below with reference to FIG. 16, when the same variable name, type and structure are configured across several controller dependent technologies, the variable mapping taking place between the controller independent variable information and the controller dependent variable creates the controller independent variable environment. FIG. 16 shows that the following steps are performed when using mapped variables:
1. First the client software 122 programmatically requests an operation to occur on the variable (i.e. read, write, query attributes, etc).
2. The client software may communicate with the motion component 40 direct or via the framework layer 32 layers, which in turn communicate with the motion component 40.
3. Upon receiving the variable request, the motion component 40 looks up the controller neutral name in a variable mapping database, making sure to collect the controller specific information for the given mapping and target driver component(s) 42. Once collected, the controller specific variable information is routed directly to the driver component 42 (or driver components 42 in a multi controller environment).

4. Upon receiving the variable request each driver component 42 may optionally verify the controller specific information.

5. Next the driver component 42 communicates the request to the target controller, for which it is designed, using the controller specific variable name, format and structure.

The controller neutral model of supporting variables may be applied to a number of different technologies in a number of different environments. Several example environments will be described below.

Industrial Automation, which refers to the automation of factory or workplace processes, uses variable based information extensively. In the following discussion, the application of the variable support systems will be briefly described in the context of the following Industrial Automation technologies: General Motion Control, CNC Motion Control, Robotic Control, Cell Control, and PLC Control.

General Motion Controllers (both software and hardware) are used for various motion based applications in a wide range of industries. For example, in the semiconductor industries, General Motion Controllers drive many of the pick-n-place and vision inspection machines. Each of the General Motion Control technologies is implemented with proprietary vendor specific technologies and most expose variables in some proprietary format. The control neutral model would allow for variables from any General Motion Control technology, regardless of vendor or implementation. The client software 122 thus is provided with a consistent system for accessing variable information from each target controller platform.

Computer Numeric Controls (CNC) are used by a wide range of machines in the metal fabrication industries. Each CNC controller supports a variant of the RS274 (G&M Code) language that usually makes the language supported a proprietary version of the original standard. Because the RS274 standard does not address variables, variables are typically handled as a proprietary extension to the RS274 standard, which the extension only works on the control technology for which it is implemented. The control neutral variable model of the present invention greatly improves upon the proprietary technologies by normalizing all variables across the various proprietary control technologies. A variable support system constructed in accordance with the present invention allow improved integration and information flow in enterprise wide systems such as data collection, analysis, and resource planning systems.

Robotic Controllers are similar to general motion controllers in that each Robotic Controller typically employs a proprietary technologies defined by the vendor of the particular Controller. A controller neutral variable support system implemented using the principles of the present invention improves upon proprietary systems by defining a generic system for accessing, manipulating, and configuring variable based information on Robotic Controllers.

A Cell Controller is a system (typically a Personal Computer) that directs the functionality of several controlled machines. The controlled machines, whether from the same vendor or from various vendors, each can implement a different manner of accessing, configuring, and using variables. A controller neutral variable support system of the present invention can simplify the process of implementing a Cell Controller that encompasses a variety of controlled machines using different control technologies.

PLC Controllers typically use variables (or tags) to access virtually all portions of their address space. A controller neutral variable support system of the present invention yields an advantage when applied to PLC Controllers because each PLC vendor typically implements their tags and variables in different proprietary ways.

In addition to Industrial Automation, the principles of the present invention may be used in what is referred to as Consumer Automation. Although the Consumer Automation industry is not yet mature, it is anticipated that the Consumer Automation industry will, like the Industrial Automation industry, face problems with proprietary controllers. A controller neutral variable support system of the present invention will in the future provide many of the same benefits in the Consumer Automation industry as are currently provided in the Industrial Automation industry.

I claim:

1. A motion event system for transmitting events between a motion program and a motion device, comprising:
   a driver component associated with the motion device;
   a motion component for allowing communication between the motion program and the driver component;
   a motion event component for configuring at least one of the driver component and the motion component to recognize events to be transmitted between the motion program and the motion device; and
   at least one subscription identifier associated with at least one event, where the driver component stores subscription information associated with each subscription identifier.

2. A motion event system as recited in claim 1, further comprising at least one data identifier associated with each event, where the driver component stores information relating each data identifier to the motion device associated with the driver component.

3. A motion event system as recited in claim 2, in which the driver component monitors data associated with each data identifier.

4. A motion event system as recited in claim 2, in which, when the driver component reads data associated with at least one of the recognized events, the motion event component generates an event that transmits the changed data to the motion program.

5. A motion event system as recited in claim 2, in which, when the driver component reads data associated with at least one of the recognized events, the motion event component generates an event that transmits the changed data and the data identifier associated with the event to the motion program.

6. A motion event system as recited in claim 2, in which, when the driver component detects a change in data associated with at least one of the recognized events, the motion event component generates an event that transmits the changed data to the motion program.

7. A motion event system as recited in claim 2, in which, when the driver component detects a change in data associated with at least one of the recognized events, the motion event component generates an event that transmits the changed data and the data identifier associated with the event to the motion program.

8. A motion event system as recited in claim 1, comprising a plurality of motion devices, where at least one driver component is associated with each of the motion devices.

9. A motion event system as recited in claim 1, in which the motion component returns the subscription identifier.

10. A motion event system as recited in claim 1, in which the motion program subscribes to at least one group of events comprising at least one event based on the subscription identifier, where the at least one event in the subscribed group of events is transmitted to the motion program.

11. A motion event system as recited in claim 10, in which the motion program unsubscribes from at least one group of events such that the at least one event in the subscribed group of events is no longer transmitted to the motion program.

12. A motion event system as recited in claim 1, in which the motion program directs the motion component to pause event processing.

13. A motion event system as recited in claim 12, in which the motion component directs the driver component to pause all event processing when the motion program directs the motion component to pause event processing.

14. A motion event system as recited in claim 12, in which the driver component discontinues sending events to the motion event component when the motion program directs the motion component to pause event processing.

15. A motion event system as recited in claim 12, in which the motion event directs the motion component to continue event processing when the pause is cancelled.

* * * * *